United States Patent
Yoda et al.

(10) Patent No.: US 9,209,636 B2
(45) Date of Patent: *Dec. 8, 2015

(54) POWER RECEPTION CONTROL DEVICE AND POWER RECEPTION CONTROL METHOD FOR NON-CONTACT POWER TRANSMISSION

(71) Applicant: SEIKO EPSON CORPORATION, Tokyo (JP)

(72) Inventors: Kentaro Yoda, Chino (JP); Takahiro Kamijo, Fujimi-cho (JP); Kota Onishi, Nagoya (JP); Masayuki Kamiyama, Nagoya (JP); Nobutaka Shiozaki, Nagoya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,792

(22) Filed: Aug. 25, 2014

(65) Prior Publication Data

US 2014/0368165 A1    Dec. 18, 2014

Related U.S. Application Data

(63) Continuation of application No. 13/689,240, filed on Nov. 29, 2012, now Pat. No. 8,836,273, which is a continuation of application No. 12/174,305, filed on Jul. 16, 2008, now Pat. No. 8,344,688.

(30) Foreign Application Priority Data

Jul. 17, 2007   (JP) ................................ 2007-186109

(51) Int. Cl.
   *H02J 7/00*     (2006.01)
   *H02J 7/02*     (2006.01)
   *H02J 17/00*    (2006.01)
   *H02J 5/00*     (2006.01)

(52) U.S. Cl.
   CPC .............. *H02J 7/0052* (2013.01); *H02J 5/005* (2013.01); *H02J 7/00* (2013.01); *H02J 7/0011* (2013.01); *H02J 7/025* (2013.01); *H02J 17/00* (2013.01); *H02J 2007/0096* (2013.01)

(58) Field of Classification Search
   CPC ........ H02J 7/025; H01F 38/14; Y02T 90/122; B60L 11/182; Y02E 60/12
   USPC ........................................................ 320/108
   See application file for complete search history.

(56) References Cited

U.S. PATENT DOCUMENTS

| | | | |
|---|---|---|---|
| 6,636,146 B1 | 10/2003 | Wehoski | |
| 6,683,438 B2 | 1/2004 | Park et al. | |
| 7,233,137 B2 | 6/2007 | Nakamura et al. | |
| 7,391,184 B2 | 6/2008 | Luo et al. | |
| 7,443,135 B2 | 10/2008 | Cho | |
| 7,518,267 B2 | 4/2009 | Baarman | |
| 7,605,563 B2 | 10/2009 | Kanno et al. | |
| 7,696,718 B2 | 4/2010 | Suzuki | |
| 8,064,825 B2 | 11/2011 | Onishi et al. | |
| 2008/0238364 A1* | 10/2008 | Weber et al. ................. | 320/108 |
| 2009/0237030 A1* | 9/2009 | Oh et al. ...................... | 320/108 |
| 2009/0278492 A1* | 11/2009 | Shimizu et al. .............. | 320/108 |
| 2010/0066304 A1* | 3/2010 | Oshimi ......................... | 320/108 |

FOREIGN PATENT DOCUMENTS

| | | |
|---|---|---|
| JP | A-08-103028 | 4/1996 |
| JP | A-2001-218391 | 8/2001 |
| JP | A-2002-34169 | 1/2002 |
| JP | A-2006-60909 | 3/2006 |
| JP | A-2006-166619 | 6/2006 |
| WO | WO 2005/109598 A1 | 11/2005 |
| WO | WO 2006/101285 A1 | 9/2006 |
| WO | WO 2007/012272 A1 | 2/2007 |

OTHER PUBLICATIONS

Mar. 12, 2010 Search Report issued in European Patent Application No. 08012906.7.
Aug. 19, 2013 Office Action issued in U.S. Appl. No. 13/689,240.
Jan. 27, 2014 Office Action issued in U.S. Appl. No. 13/689,240.

* cited by examiner

*Primary Examiner* — Arun Williams
(74) *Attorney, Agent, or Firm* — Oliff PLC

(57) ABSTRACT

A power reception control device provided in a power reception device of a non-contact power transmission system includes a power-reception-side control circuit that controls an operation of the power reception device, and a power supply control signal output terminal that supplies a power supply control signal to a charge control device, the power supply control signal controlling power supply to a battery. The power-reception-side control circuit controls a timing at which the power supply control signal (ICUTX) is output from the power supply control signal output terminal. The operation of the charge control device is compulsorily controlled using the power supply control signal (ICUTX).

18 Claims, 23 Drawing Sheets

FIG. 9A
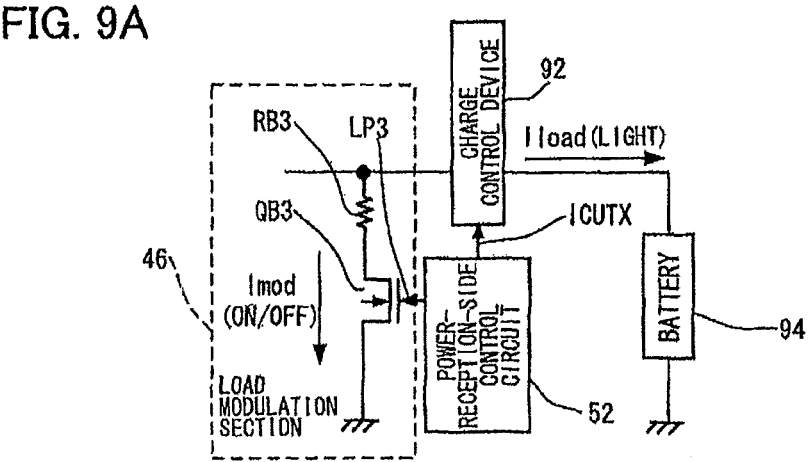
FIG. 9B
FIG. 9C
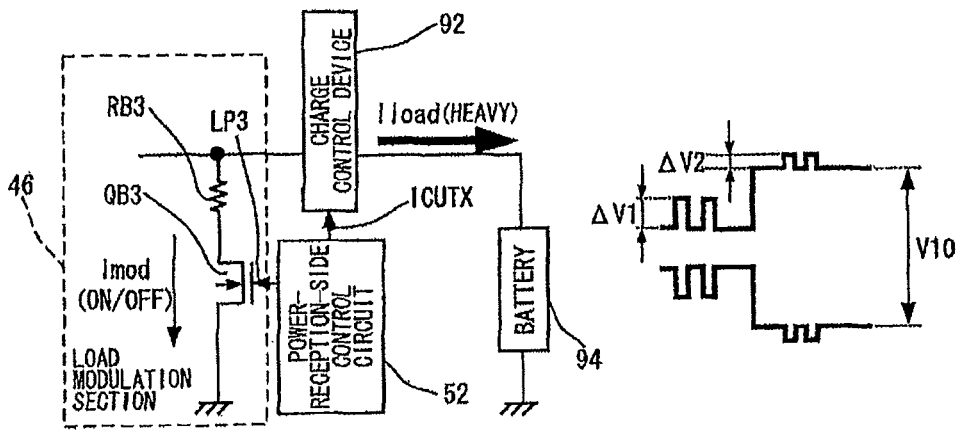
FIG. 9D
FIG. 9E
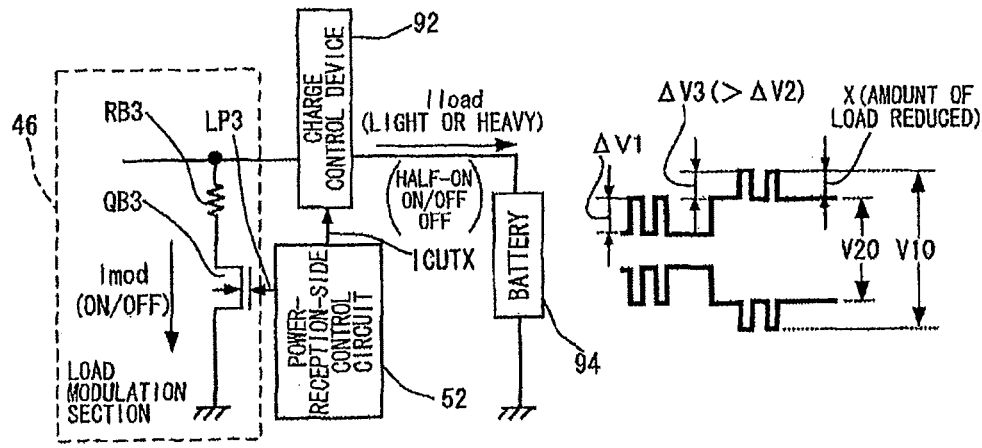

POWER RECEPTION CONTROL DEVICE AND POWER RECEPTION CONTROL METHOD FOR NON-CONTACT POWER TRANSMISSION

This is a Continuation of application Ser. No. 13/689,240 filed Nov. 29, 2012, which in turn is a Continuation of application Ser. No. 12/174,305 filed Jul. 16, 2008 and issued as U.S. Pat. No. 8,344,688 on Jan. 1, 2013, which claims priority of Japanese Patent Application No. 2007-186109 filed on Jul. 17, 2007. The disclosures of these prior applications are hereby incorporated by reference herein in their entirety.

BACKGROUND OF THE INVENTION

The present invention relates to a power reception control device, a power reception device, a non-contact power transmission system, a charge control device, a battery device, and an electronic instrument.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset or watch), and the like have been proposed.

JP-A-2006-60909 discloses a non-contact power transmission device using a primary coil and a secondary coil, for example. JP-A-2006-166619 discloses the circuit configuration of a charging device for a secondary battery (e.g., lithium-ion battery), for example.

Since a related-art non-contact power transmission device is configured so that a power-reception-side control circuit merely has a power reception function and a function of controlling power supplied to a battery (e.g., battery pack), a dedicated charge control circuit controls a charging current (and a charging voltage) supplied to the battery.

According to this configuration, the non-contact power transmission system cannot positively control the charging current (charging voltage) supplied to the battery. Therefore, the functions that can be implemented are limited.

It is important to take measures against a foreign object in order to improve the safety and the reliability of the non-contact power transmission system. Specifically, when power is transmitted in a state in which a metal foreign object is present, abnormal heat generation may occur. In this case, power transmission must be stopped. A metal foreign object may be small or medium-sized, or may be large (e.g., a thin sheet which is present over the entire area between a primary-side instrument and a secondary-side instrument). Therefore, it is desirable to take appropriate safety measures irrespective of the size or type of foreign object.

For example, when a thin sheet-shaped metal foreign object is inserted to completely block a primary-side instrument and a secondary-side instrument during power transmission, the primary-side instrument device may erroneously regard the metal foreign object as the secondary-side instrument and continue power transmission. Such an erroneous power transmission state is hereinafter referred to as "takeover state". It is difficult to detect the takeover state using related-art technology.

SUMMARY

According to one aspect of the invention, there is provided a power reception control device provided in a power reception device, the power reception device being included in a non-contact power transmission system that performs non-contact power transmission from a power transmission device to the power reception device through a primary coil and a secondary coil that are electromagnetically coupled, the power reception device supplying power to a battery device, the power reception control device comprising:

a power-reception-side control circuit that controls an operation of the power reception device; and a power supply control signal output terminal that supplies a power supply control signal to the battery device, the power supply control signal controlling power supplied to the battery device, the power-reception-side control circuit controlling a timing at which the power supply control signal is output from the power supply control signal output terminal.

According to another aspect of the invention, there is provided a power reception device comprising:

a power reception section that converts an induced voltage in the secondary coil into a direct-current voltage;

the above power reception control device; and an output terminal that outputs a power supply control signal output from the power reception control device to a battery device.

According to another aspect of the invention, there is provided an electronic instrument comprising:

the above power reception device; and a battery device that receives power from the power reception device.

According to another aspect of the invention, there is provided a non-contact power transmission system comprising:

a power transmission device;

a primary coil;

a secondary coil;

a power reception device including the above power reception control device; and a battery device that receives power from the power reception device.

According to another aspect of the invention, there is provided a charge control device included in a battery device as a power supply target of a non-contact power transmission system, the charge control device receiving power supplied from a power reception device of a non-contact power transmission system, and controlling charging of a battery included in the battery device, the operation of the charge control device that controls charging of the battery being controlled using a power supply control signal output from the power reception device.

According to another aspect of the invention, there is provided a battery device comprising:

the above charge control device; and a battery, charging of the battery being controlled by the charge control device.

BRIEF DESCRIPTION OF THE SEVERAL VIEWS OF THE DRAWING

FIGS. 9A to 9E are views illustrative of a battery load reduction operation.

DETAILED DESCRIPTION OF THE EMBODIMENT

Figure 1A:
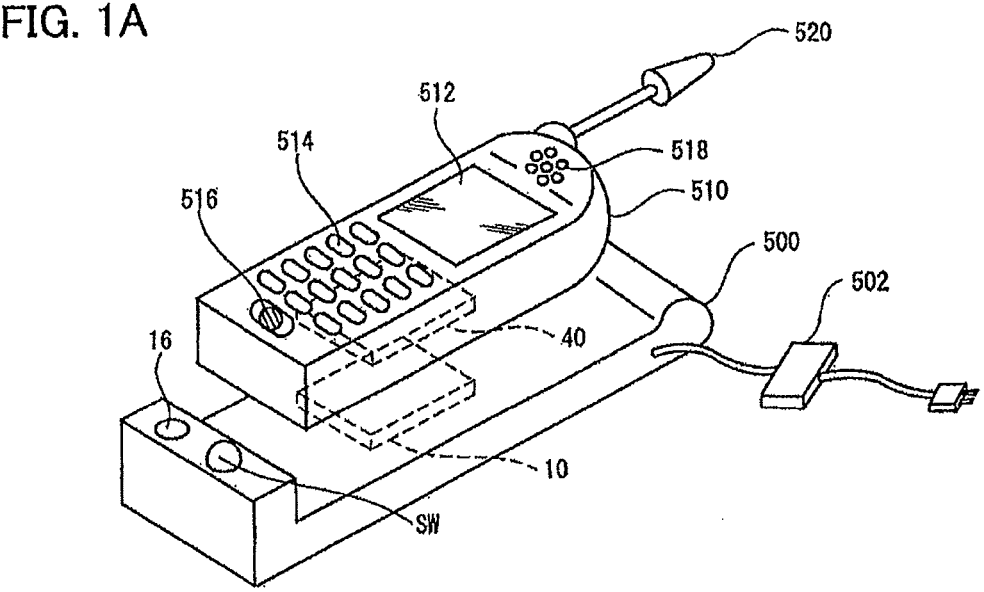
FIGS. 1A to 1C are views illustrative of examples of an electronic instrument to which non-contact power transmission technology is applied, and the principle of non-contact power transmission using an induction transformer.

At least one embodiment of the invention may enable a non-contact power transmission system (power-reception-side control circuit) to positively control a charging current (charging voltage) supplied to a power-supply-target load (e.g., battery), for example.

At least one embodiment of the invention may enable detection of a takeover state by causing a power-reception-side (secondary-side) instrument to perform intermittent load modulation. At least one embodiment of the invention may also enable a power-transmission-side (primary-side) instrument to easily detect load modulation by reducing the load state of the power-supply-target load (e.g., battery) when performing load modulation, whereby the takeover state detection accuracy may be improved, for example.

(1) According to one embodiment of the invention, there is provided a power reception control device provided in a power reception device, the power reception device being included in a non-contact power transmission system that performs non-contact power transmission from a power transmission device to the power reception device through a primary coil and a secondary coil that are electromagnetically coupled, the power reception device supplying power to a battery device, the power reception control device comprising:

a power-reception-side control circuit that controls an operation of the power reception device; and a power supply control signal output terminal that supplies a power supply control signal to the battery device, the power supply control signal controlling power supplied to the battery device, the power-reception-side control circuit controlling a timing at which the power supply control signal is output from the power supply control signal output terminal.

The battery device as the power supply target of the non-contact power transmission system includes a battery and a charge control device (e.g., charge control IC) that controls charging of the battery, for example.

The power reception control device (e.g., power reception device control IC) that controls the operation of the power reception device of the non-contact power transmission system can output the power supply control signal (ICUTX) to the charge control device (e.g., charge control IC) that controls charging of the battery, for example. Therefore, the power reception control device that controls the operation of the power reception device of the non-contact power transmission system can positively take part in the operation of charging the battery as the power-supply-target load.

The power supply control signal (ICUTX) is output from the power supply control signal output terminal provided in the power reception control device, and the output timing of the power supply control signal (ICUTX) is controlled by the power-reception-side control circuit. This function enables a novel operation.

For example, when the charge control device does not operate normally, the charging current can be adjusted by externally controlling the power supply function of the charge control device using the power supply control signal (ICUTX).

The power transmission device may issue a battery control command to the power reception device, and the power reception control device may control power supplied to the battery using the power supply control signal (ICUTX).

For example, when charging the battery which has been consumed to a large extent, the charging time can be reduced by increasing the charging current using the power supply control signal (ICUTX) in the initial charging stage.

When the power reception device transmits a signal to the power transmission device by means of load modulation, a situation in which charging of the battery hinders communication by means of load modulation can be prevented by reducing (or stopping) the charging current supplied to the battery using the power supply control signal (ICUTX). A takeover state (e.g., a state in which a thin sheet-shaped metal foreign object is inserted between the primary coil and the secondary coil to block electromagnetic coupling between the primary coil and the secondary coil) can be reliably detected by the power transmission device by utilizing the above-described function.

Since the power reception control device controls power supplied to the battery through the charge control device, the power reception control device need not include a power supply limiting means or the like. This makes it unnecessary to provide an additional circuit. Therefore, the power reception control device can be implemented by a minimum circuit configuration.

Since power supplied to the battery is controlled through the charge control device provided at a position closest to the battery (e.g., secondary battery), highly accurate power supply control can be implemented. For example, charge control with higher accuracy can be easily implemented by utilizing the charge control function (e.g., charging current regulation function or negative feedback control function) of the charge control device.

(2) In the power reception control device according to this embodiment, the battery device may include a battery and a charge control device that controls charging of the battery; and the resistance of a current regulation resistor that adjusts a charging current supplied to the battery may be controlled using the power supply control signal output from the power reception control device so that the charging current supplied to the battery is adjusted.

This embodiment illustrates an example of battery power supply control performed using the power supply control signal (signal ICUTX). In this embodiment, the resistance of the current regulation resistor is controlled using the power supply control signal (signal ICUTX). Power supplied to the battery can be externally controlled by a simple configuration. The current regulation resistor may be an internal resistor (e.g., a resistor provided in the charge control IC), or may be an external resistor (e.g., a resistor externally connected to a resistor connection terminal of the charge control IC).

(3) In the power reception control device according to this embodiment, the current regulation resistor may be an external resistor, and a control element that changes the resistance of the current regulation resistor as the external resistor may be provided in the charge control device; and the power supply control signal may control an operation of the control element to adjust the resistance of the current regulation resistor as the external resistor.

Specifically, an external resistor is used as the current regulation resistor, and the resistance of the external resistor is controlled using the control element. According to this configuration, power supplied to the battery can be controlled using the power supply control signal (signal ICUTX) without changing the internal circuit configuration of the charge control IC included in the charge control device, for example.

Moreover, control such as changing the charging current in a plurality of stages can be easily implemented by merely changing the configuration of an external circuit, for example.

(4) In the power reception control device according to this embodiment, the battery device may include a battery and a charge control device that controls charging of the battery;

the charge control device may control a charging current or a charging voltage supplied to the battery to be set at a desired value using a negative feedback control circuit; and the power supply control signal output from the power reception control device may control an operation of the negative feedback control circuit included in the charge control device to adjust the charging current.

The operation of the negative feedback control circuit included in the charge control device is controlled using the power supply control signal (ICUTX) to compulsorily control the charging current supplied to the battery. The amount of the charging current can be controlled with high accuracy by utilizing negative feedback control. Moreover, the amount of the charging current can be finely adjusted.

(5) In the power reception control device according to this embodiment, the battery device may include a battery and a charge control device that controls charging of the battery;

the charge control device may include a power supply regulation circuit provided in a power supply path connected to the battery; and the power supply control signal output from the power reception control device may control an operation of the power supply regulation circuit to adjust the charging current.

In this embodiment, the power supply regulation circuit is provided in the power supply path of the charge control device, and the power supply regulation circuit is operated using the power supply control signal (ICUTX) to reduce (or temporarily stop) power supplied to the battery device, for example. Since power supply through the power supply path is directly controlled, complicated control is unnecessary. Moreover, the internal circuit does not become complicated.

(6) In the power reception control device according to this embodiment, the power reception control device may further include a load modulation section that modulates a load of the power reception device, the power-reception-side control circuit may cause the load modulation section to intermittently change the load of the power reception device when power is supplied to the battery device through the charge control device, and may output the power supply control signal from the power supply control signal output terminal to reduce or stop power supplied to the battery device in a period in which the load of the power reception device is intermittently changed.

Specifically, power supplied to the battery device is reduced or stopped using the power supply control signal (ICUTX) in synchronization with intermittent load modulation performed by the power reception device. The power reception device performs load modulation intermittently (e.g., cyclically or regularly). Load modulation is performed by causing a load-modulation transistor to be turned ON/OFF, for example.

The power transmission device detects intermittent load modulation performed by the power reception device. If intermittent load modulation (change in load) cannot be detected, the power transmission device determines that a takeover state (i.e., a state in which a metal foreign object takes over power transmitted from the power transmission device) has occurred.

When the load state of the battery (i.e., power-supply-target load) is heavy (i.e., when a large amount of charging current flows), it is difficult for the power transmission device to detect a change in coil end voltage of the primary coil due to intermittent load modulation, for example.

Therefore, the power transmission device can reliably receive a load modulation signal by reducing the load of the battery in a period (load modulation period) in which the power reception device performs load modulation. The load reduction process may be performed only when the load of the battery is heavy, or may be necessarily performed in synchronization with a load modulation period. The load may also be reduced by reducing or temporarily stopping the charging current supplied to the battery.

(7) In the power reception control device according to this embodiment, the power-reception-side control circuit may create a load reduction period in which power supplied to the battery device is reduced or stopped due to output of the power supply control signal, and may cause the load modulation section to perform load modulation during the load reduction period.

Specifically, the load reduction period is created using the power supply control signal (ICUTX), and the load is modulated during (part of) the load reduction period In the load reduction period, the charging current supplied to the battery is reduced (or stopped) so that the load state of the battery (i.e., power-supply-target load) is reduced. Therefore, when the power reception device performs load modulation (e.g., momentarily increases the load of the power reception device), the power transmission device can reliably detect a change in coil end voltage (or coil end current) of the primary coil due to load modulation. This improves the regular load authentication accuracy.

(8) According to another embodiment of the invention, there is provided a power reception device comprising:

a power reception section that converts an induced voltage in the secondary coil into a direct-current voltage;

the above power reception control device; and an output terminal that outputs a power supply control signal output from the power reception control device to a battery device.

This embodiment specifies the configuration of the power reception device (provided with the power reception control device according to the invention). When the power reception control device is an IC, the power reception device may be implemented as a module that includes the IC, for example. The power reception device also includes a terminal that outputs the power supply control signal (ICUTX).

(9) According to another embodiment of the invention, there is provided an electronic instrument comprising:

the above power reception device; and a battery device that receives power from the power reception device.

The electronic instrument according to this embodiment has a function of directly controlling the battery to implement various operations differing from those implemented by related art. Therefore, the electronic instrument including the power reception device has high performance, a reduced size, and excellent reliability and safety.

(10) According to another embodiment of the invention, there is provided a non-contact power transmission system comprising:

a power transmission device;

a primary coil;

a secondary coil;

a power reception device including the above power reception control device; and a battery device that receives power from the power reception device.

According to this embodiment, a novel non-contact power transmission system that can externally and directly control the charge state of the battery device (e.g., including a charge control device and a battery as the power-supply-target load).

(11) According to another embodiment of the invention, there is provided a charge control device included in a battery device as a power supply target of a non-contact power transmission system, the charge control device receiving power supplied from a power reception device of a non-contact power transmission system, and controlling charging of a battery included in the battery device, the operation of the charge control device that controls charging of the battery being controlled using a power supply control signal output from the power reception device.

Specifically, a configuration example of the charge control device conforming to a novel non-contact power transmission system is specified. The charge control device includes a power supply control signal input terminal to which the power supply control signal is input.

(12) In the charge control device according to this embodiment, the resistance of a current regulation resistor that adjusts a charging current supplied to the battery may be controlled using the power supply control signal.

The amount of charging current (power) supplied to the battery can be programmed using the current regulation resistor. Power supplied to the battery can be compulsorily and externally controlled using the power supply control signal (ICUTX) by positively utilizing the above-described function.

(13) In the charge control device according to this embodiment, the current regulation resistor may be an external resistor, and a control element that changes the resistance of the current regulation resistor as the external resistor may be provided in the charge control device; and an operation of the control element may be controlled using the power supply control signal so that the resistance of the current regulation resistor as the external resistor is adjusted.

Specifically, an external resistor is used as the current regulation resistor, and the resistance of the external resistor is controlled using the control element. According to this configuration, power supplied to the battery can be controlled using the power supply control signal (signal ICUTX) without changing the internal circuit configuration of the charge control IC included in the charge control device. Moreover, control such as changing the charging current in a plurality of stages can be easily implemented by merely changing the configuration of an external circuit, for example.

(14) In the charge control device according to this embodiment, the charge control device may include a negative feedback control circuit, the negative feedback control circuit controlling a current or a voltage supplied to the battery to be set at a desired value, an operation of the negative feedback control circuit included in the charge control device may be controlled using the power supply control signal.

The operation of the negative feedback control circuit included in the charge control device is controlled using the power supply control signal (ICUTX) to compulsorily control the charging current supplied to the battery. The amount of the charging current can be controlled with high accuracy by utilizing negative feedback control. Moreover, the amount of the charging current can be finely adjusted.

(15) In the charge control device according to this embodiment, the charge control device may include a power supply regulation circuit provided in a power supply path connected to the battery, an operation of the power supply regulation circuit may be controlled using the power supply control signal.

In the charge control device according to this embodiment, the power supply regulation circuit is provided in the power supply path, and power supplied to the battery is reduced or stopped using the power supply control signal (ICUTX). Since power supply through the power supply path is directly controlled, complicated control is unnecessary. Moreover, the internal circuit does not become complicated.

(16) According to another embodiment of the invention, there is provided a battery device comprising:

the above charge control device; and a battery, charging of the battery being controlled by the charge control device.

The battery device includes the charge control device and the battery (e.g., secondary battery). As an example of the battery device, a secondary battery pack including a charge control IC may be mentioned, for example. The term "battery" also includes a battery having a charge control function.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

First Embodiment

Examples of an electronic instrument to which the invention is suitably applied and the principle of non-contact power transmission technology are described below.

Figure 1B:
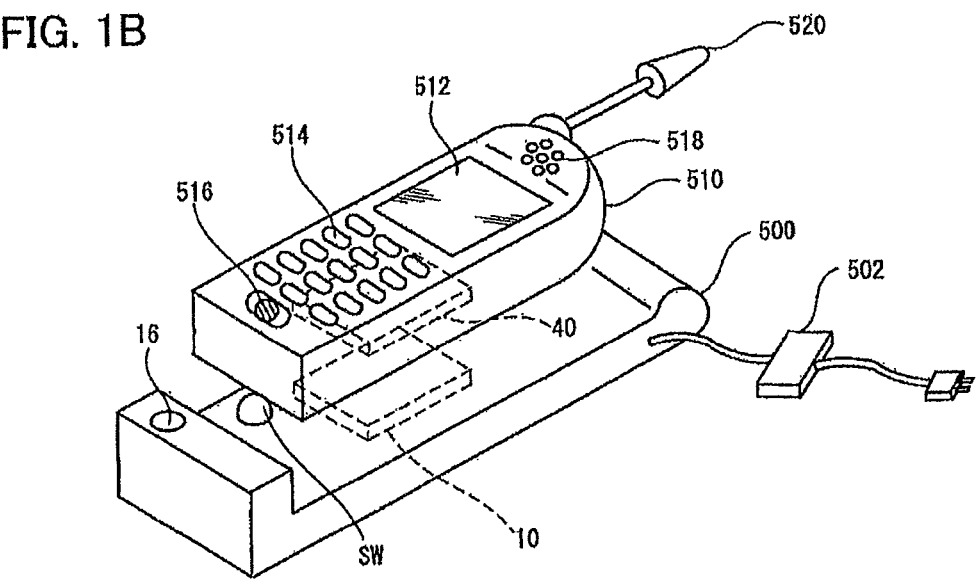
Figure 1C:
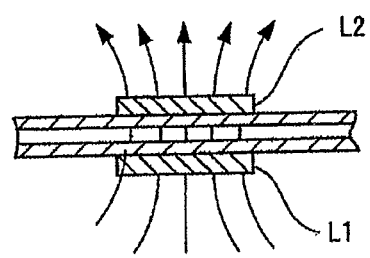

Examples of Electronic Instrument and Principle of Non-Contact Power Transmission FIGS. 1A to 1C are views illustrative of examples of an electronic instrument to which the non-contact power transmission technology is applied, and the principle of non-contact power transmission using an induction transformer.

As shown in FIGS. 1A and 1B, a charger (cradle) 500 (i.e., power-transmission-side electronic instrument) includes a power transmission device (e.g., power transmission module including a power-transmission-side control circuit (power-transmission-side control IC)) 10.

The charger (cradle) 500 also includes a switch (SW) that causes (triggers) power transmission to start or stop, and a display section (e.g., LED) 16 that is turned ON when the charger transmits power (operates). Note that the switch (SW) may not be provided.

In the charger (cradle) 500 shown in FIG. 1A, the switch (SW) is provided outside an area in which a power-reception-side electronic instrument (portable telephone) 510 is placed. When the user who desires to charge the portable telephone 510 has pressed the switch (SW) with the finger, the power transmission device 10 starts power transmission (temporary power transmission for position detection and ID authentication: described later). When the switch (SW) has been pressed during power transmission (including temporary power transmission and normal power transmission), power transmission is necessarily (compulsorily) stopped.

As the switch (SW), a mechanical momentary switch may be used, for example. Note that the switch (SW) is not limited thereto. Various switches such as a relay switch and a magnet switch may also be used.

In the charger (cradle) 500 shown in FIG. 1B, the switch (SW) is provided inside an area in which the power-reception-side electronic instrument (portable telephone) 510 is placed. Therefore, when the portable telephone 510 is placed on the charger (cradle) 500, the switch (SW) is automatically pressed (turned ON) due to the weight of the charger (cradle) 500. This causes the charger (cradle) 500 to start power transmission (temporary power transmission for position detection and ID authentication: described later).

When the switch (SW) has been pressed during power transmission (including temporary power transmission and normal power transmission) (e.g., when the portable telephone 510 has been removed from the charger (cradle) 500 and then placed on the charger (cradle) 500 so that the switch (SW) has been pressed again), power transmission is necessarily stopped.

In FIG. 1B, the switch (SW) causes power transmission to start in the same manner as in FIG. 1A, but is not used to detect the presence of the portable telephone 510 (removal of the portable telephone 510 is basically determined based on an induced voltage in a primary coil: described later). Note that the switch (SW) may also have a function of detecting the presence of the portable telephone 510.

The portable telephone 510 (i.e., power-reception-side electronic instrument) includes a power reception device (e.g., power transmission module including a power-reception-side control circuit (power-reception-side control IC)) 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

As schematically shown in FIG. 1C, power transmission from the power transmission device 10 to the power reception device 40 is implemented by electromagnetically coupling a primary coil L1 (power-transmission-side coil) provided in the power transmission device 10 and a secondary coil L2 (power-reception-side coil) provided in the power reception device 40 to form a power transmission transformer. This enables non-contact power transmission.

Note that the switch (SW) is not an indispensable element. The switch (SW) need not necessarily be provided when the presence of the portable telephone (power-reception-side instrument) 510 can be detected.

Note that the electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

Examples of particularly suitable electronic instruments include a portable terminal (including a portable telephone terminal, PDA terminal, and portable personal computer terminal) and a watch. Since the power reception device according to the invention has a simple configuration and a reduced size, the power reception device can be incorporated in a portable terminal or the like. The charging time of a secondary battery provided in an electronic instrument can be reduced using the power reception device according to the invention due to low loss. Moreover, since the power reception device according to the invention reduces heat generation, the reliability of an electronic instrument is improved from the viewpoint of safety.

In particular, since a large amount of charging current flows through a portable terminal (including a portable telephone terminal, PDA terminal, and portable personal computer terminal) under heavy load, heat may be generated to a large extent. A watch is an instrument for which a reduction in size and power consumption is strongly demanded. Therefore, it is important to reduce loss when charging a battery. Therefore, the features of the invention (i.e., low loss and low heat generation) can be sufficiently utilized for these instruments.

Load Control Using Power Reception Device

In this embodiment, the power reception device (secondary-side device (e.g., module device) that receives power from the power transmission device) positively controls power supplied to a battery (e.g., secondary battery) provided in a battery device (e.g., battery pack). This feature is described below.

Figure 2:
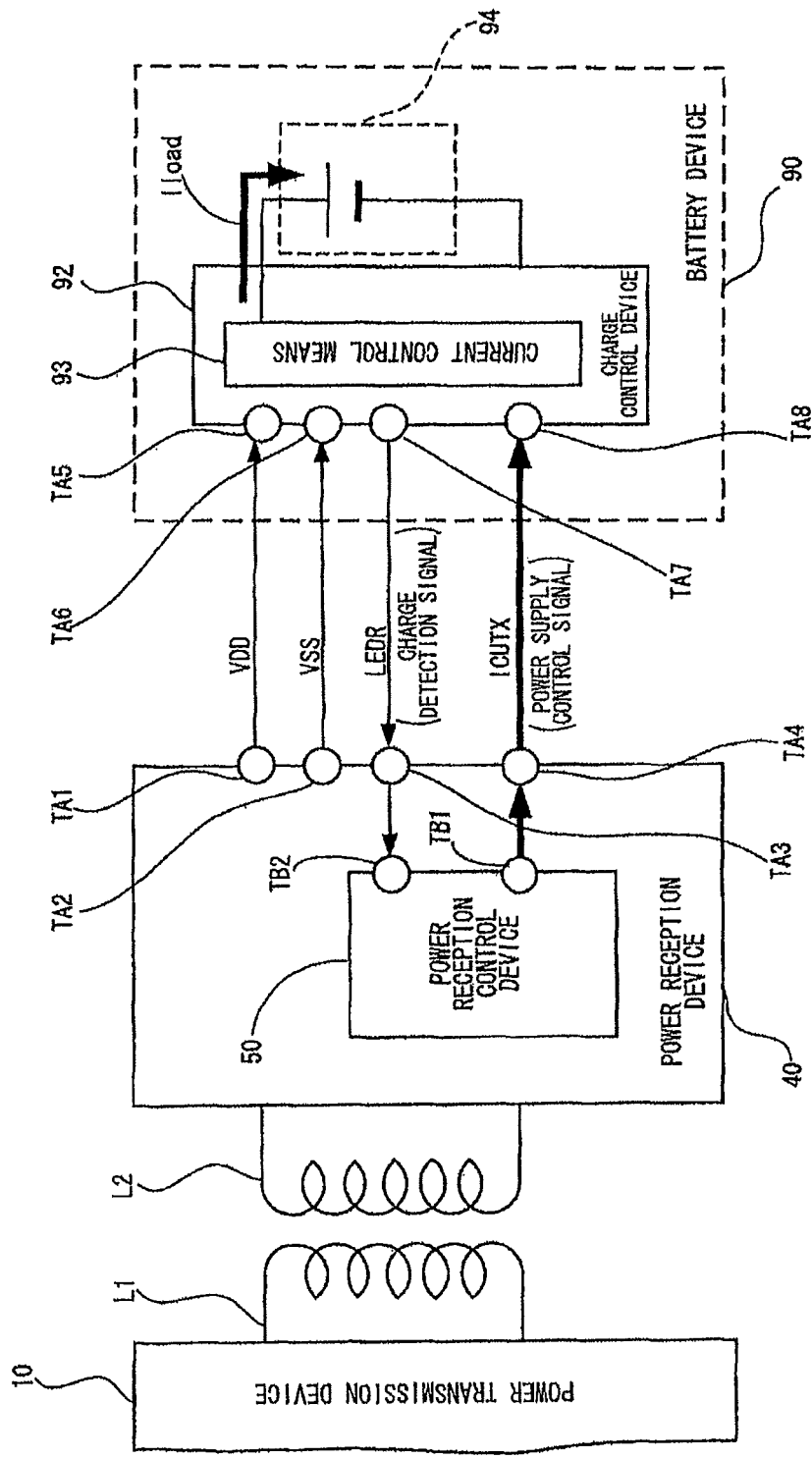
FIG. 2 is a view illustrative of load power supply control performed by a power reception device.

FIG. 2 is a view illustrative of load power supply control performed by the power reception device. The power transmission device 10 transmits power to the power reception device 40 by means of non-contact power transmission through the primary coil (L1) and the secondary coil (L2). The power reception device 40 operates using power transmitted from the power transmission device 10, and supplies power to a charge control device (the charge control device acts as a load since the charge control device consumes power).

A charge control device 92 is a dedicated IC that controls charging of a battery 94, for example. The charge control device 92 and the battery 94 may be separate (independent) components, or may be integrally provided as a battery device 90.

The following description is given on the assumption that the charge control device 92 and the battery 94 are provided in the battery device 90 (note that the invention is not limited thereto). The entire battery device 90 may be considered to be a load (may be referred to as the battery device 90). The battery 94 acts as a power-supply-target load.

As shown in FIG. 2, the power reception device (e.g., module device) 40 includes power terminals (TA1 and TA2) that supply power supply voltages (VDD and VSS) to the battery device 90, a terminal (TA3) that receives a charge detection signal (LEDR) from the battery device 90, and an output terminal (TA4) that supplies a power supply control signal (ICUTX) to the battery device 90.

The power reception device 40 includes a power reception control device (IC) 50. The power reception control device (IC) 50 includes two terminals TB1 and TB2. The terminal TB1 is a power supply control signal output terminal that outputs the power supply control signal (ICUTX), and the terminal TB2 is a terminal that receives the charge detection signal (LEDR).

The power reception device 40 includes the four terminals TA1 to TA4. The terminals TA1 and TA2 are power supply (VDD and VSS) terminals, the terminal TA4 is a power supply control signal output terminal that outputs the power supply control signal (ICUTX), and the terminal TA3 is a terminal that receives the charge detection signal (LEDR).

The battery device 90 includes four nodes (TA5 to TA8) respectively provided corresponding to the terminals (TA1 to TA4) of the power reception device 40, the battery (e.g., secondary battery) 94, and the charge control device 92 (including a current control means 93, for example).

The power supply control signal (ICUTX) controls the operation of the current control means 93 provided in the charge control device 92, for example, whereby power (charging current Iload) supplied to the battery 94 is compulsorily controlled. The configuration and the operation of the current control means 93 are described later with reference to FIGS. 11 to 14. The current control means 93 may be provided in a charge control IC included in the charge control device 92, or may be provided outside the charge control IC as an external adjustment means.

Since the power reception device 40 can compulsorily control the battery device 90 with regard to the function of supplying power to the battery, various operations differing from those implemented by related art can be implemented. For example, the following novel operations can be achieved.

(1) For example, when the charge control device 92 does not operate normally, the charging current can be adjusted by externally controlling the power supply function of the charge control device 92 (i.e., the operation of the current control means 93) using the power supply control signal (ICUTX).

(2) The operation of the battery device 90 with regard to power supplied to the battery 94 can be controlled by causing the power transmission device 10 to issue a battery control command to the power reception device 40.

(3) A special charge mode differing from normal charge operation can be implemented by positively utilizing the power supply control signal (ICUTX). For example, when charging the battery 94 which has been consumed to a large extent, the charging time can be reduced by increasing the amount of current received by the battery 94 in an early stage of charging.

(4) When the power reception device 40 transmits a signal to the power transmission device 10 by means of load modulation, a situation in which charging of the battery hinders communication by means of load modulation can be prevented by reducing (or stopping) the charging current (Iload) supplied to the battery 94 using the power supply control signal (ICUTX).

(5) A takeover state (e.g., a state in which a thin sheet-shaped metal foreign object is inserted between the primary coil and the secondary coil to block electromagnetic coupling between the primary coil and the secondary coil) can be reliably detected by the power transmission device 10 by utilizing the function described in (4).

(6) Since power supplied to the battery is controlled through the charge control device 92 provided in the battery device 90, it is unnecessary to provide an additional circuit. Therefore, it suffices to provide a minimum circuit configuration.

(7) Since power supplied to the battery is controlled through the charge control device 92 provided at a position closest to the battery (e.g., secondary battery) 94, highly accurate power supply control can be implemented. Charge control with higher accuracy can be easily implemented by utilizing the charge control function (e.g., charging current negative feedback control function) of the charge control device 92.

Figure 3:
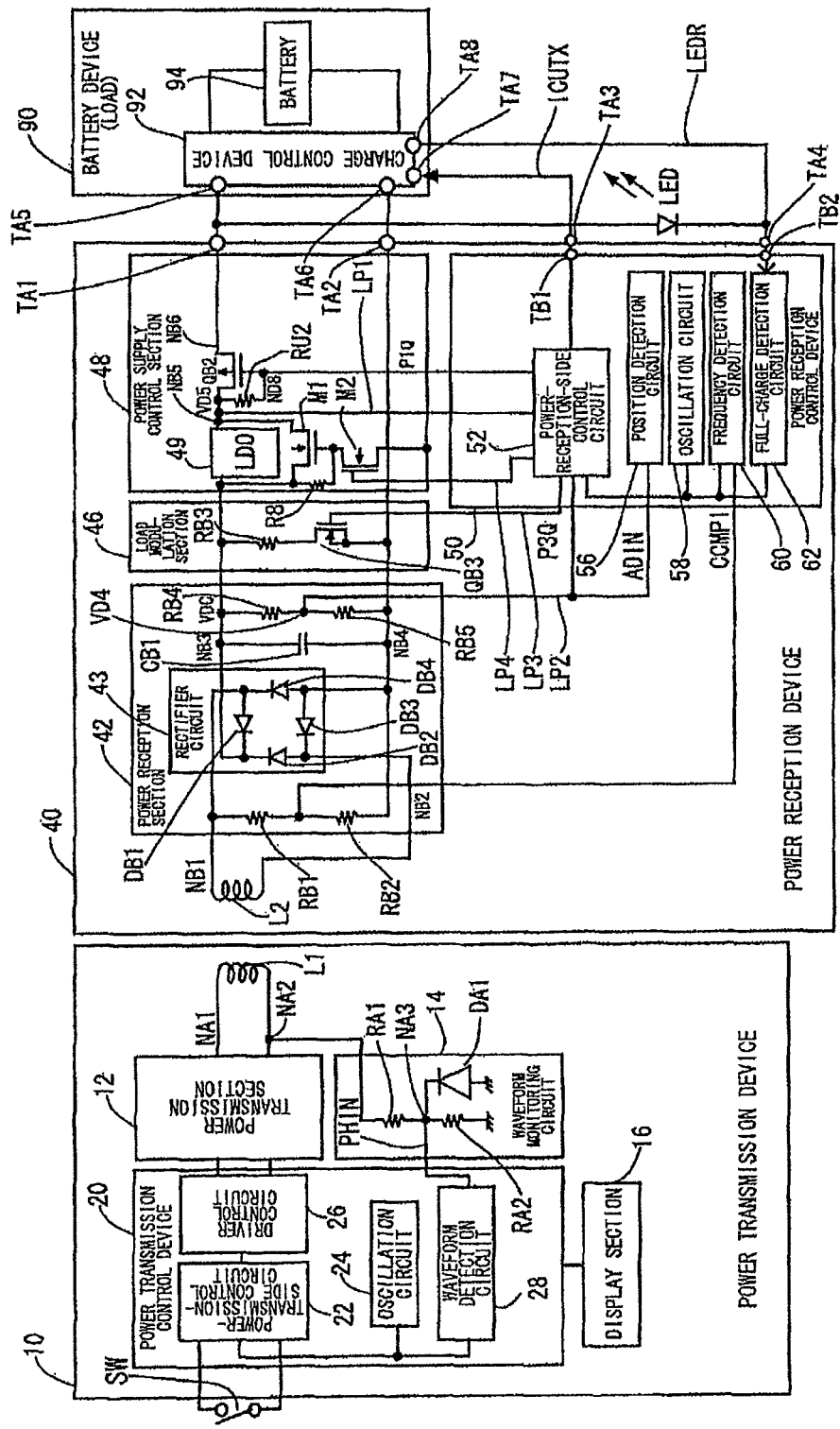
FIG. 3 is a circuit diagram showing an example of a specific configuration of each section of a non-contact power transmission system that includes a power transmission device and a power reception device.

Specific Examples of Configurations of Power Transmission Device and Power Reception Device FIG. 3 is a circuit diagram showing an example of a specific configuration of each section of a non-contact power transmission system that includes the power transmission device and the power reception device.

As shown in FIG. 3, the power transmission device 10 includes a power transmission control device 20, a power transmission section 12, and a waveform monitoring circuit 14. The power transmission control device 20 includes a power-transmission-side control circuit 22, an oscillation circuit 24, a driver control circuit 26, and a waveform detection circuit 28.

The power reception device 40 includes a power reception section 40, a load modulation section 46, and a power supply control section 48. The load (battery device) 90 includes the charge control device 92 and the battery (secondary battery) 94. The details are described below.

A power-transmission-side electronic instrument such as the charger 500 includes at least the power transmission device 10 shown in FIG. 2. A power-reception-side electronic instrument such as the portable telephone 510 includes at least the power reception device 40 and the battery device 90.

The configuration shown in FIG. 2 implements a non-contact power transmission (contactless power transmission) system in which power is transmitted from the power transmission device 10 to the power reception device 40 by electromagnetically coupling the primary coil L1 and the secondary coil L2, and power (voltage VOUT) is supplied to the battery device 90 from a voltage output node NB7 of the power reception device 40.

The power transmission device 10 (power transmission module or primary module) may include the primary coil L1, the power transmission section 12, the waveform monitoring circuit 14, a display section 16, and the power transmission control device 20. The power transmission device 10 and the power transmission control device 20 are not limited to the configuration shown in FIG. 2. Various modifications may be made such as omitting some elements (e.g., display section and waveform monitoring circuit), adding other elements, or changing the connection relationship.

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1.

Figure 4A:
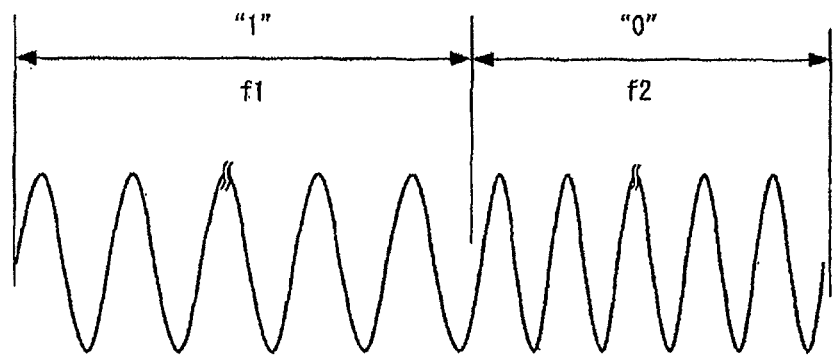
FIGS. 4A and 4B are views illustrative of the principle of information transmission between a primary-side instrument and a secondary-side instrument.
Figure 4B:
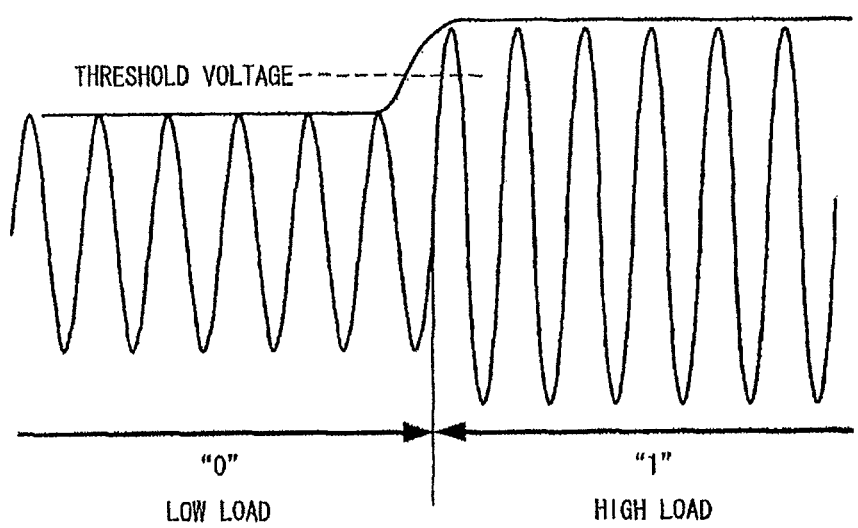

FIGS. 4A and 4B are views illustrative of the principle of information transmission between a primary-side instrument and a secondary-side instrument. Information is transmitted from the primary-side instrument to the secondary-side instrument utilizing frequency modulation. Information is transmitted from the secondary-side instrument to the primary-side instrument utilizing load modulation.

As shown in FIG. 4A, the power transmission device 10 generates an alternating-current voltage at a frequency f1 when transmitting data "1" to the power reception device 40, and generates an alternating-current voltage at a frequency f2 when transmitting data "0" to the power reception device 40, for example. As shown in FIG. 4B, the power reception device 40 can switch the load state between a low-load state and a high-load state by load modulation to transmit data "0" or "1" to the primary-side instrument (power transmission device 10).

The power transmission section 12 shown in FIG. 3 may include a first power transmission driver that drives one end of the primary coil L1, a second power transmission driver that drives the other end of the primary coil L1, and at least one capacitor that forms a resonant circuit with the primary coil L1. Each of the first and second power transmission drivers included in the power transmission section 12 is an inverter circuit (or buffer circuit) that includes a power MOS transistor, for example, and is controlled by the driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIG. 1. When power transmission is unnecessary, the charger 500 and the portable telephone 510 are physically separated so that a magnetic flux of the primary coil L1 does not pass through the secondary coil L2.

As the primary coil L1 and the secondary coil L2, a planar coil formed by spirally winding an insulated wire in a single plane may be used, for example. Note that a planar coil formed by spirally winding a twisted wire (i.e., a wire obtained by twisting a plurality of insulated thin wires) may also be used.

The waveform monitoring circuit 14 is a circuit that detects an induced voltage in the primary coil L1. The waveform monitoring circuit 14 includes resistors RA1 and RA2, and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmission device 10. The power transmission control device 20 may be implemented by an integrated circuit device (IC) or the like. The power transmission control device 20 includes the power-transmission-side control circuit 22, the oscillation circuit 24, the driver control circuit 26, and the waveform detection circuit 28.

The power-transmission-side control circuit 22 controls the power transmission device 10 and the power transmission control device 20. The power-transmission-side control circuit 22 may be implemented by a gate array, a microcomputer, or the like.

Specifically, the power-transmission-side control circuit 22 performs sequence control and a determination process necessary for power transmission, load detection, frequency modulation, foreign object detection, removal (detachment) detection, and the like. The power-transmission-side control circuit 22 starts temporary power transmission for position detection and ID authentication targeted at the power reception device 40 when the switch (SW) has been turned ON, for example.

The oscillation circuit 24 includes a crystal oscillation circuit or the like, and generates a primary-side clock signal. The driver control circuit 26 generates a control signal at a desired frequency based on the clock signal generated by the oscillation circuit 24, a frequency setting signal output from the control circuit 22, and the like, and outputs the generated control signal to the power transmission drivers (not shown) of the power transmission section 12 to control the operations of the power transmission drivers.

The waveform detection circuit 28 monitors the waveform of the signal PHIN that corresponds to an induced voltage at one end of the primary coil L1, and performs load detection, foreign object detection, and the like. For example, when the load modulation section 46 of the power reception device 40 has performed load modulation for transmitting data to the power transmission device 10, the signal waveform of the induced voltage in the primary coil L1 changes correspondingly.

As shown in FIG. 4B, the amplitude (peak voltage) of the signal waveform decreases when the load modulation section 46 of the power reception device 40 reduces load in order to transmit data "0", and the amplitude of the signal waveform increases when the load modulation section 46 increases load in order to transmit data "1". Therefore, the waveform detection circuit 28 can determine whether the data transmitted from the power reception device 40 is "0" or "1" by determining whether or not the peak voltage has exceeded a threshold voltage, by performing a peak-hold process on the signal waveform of the induced voltage, for example. Note that the waveform detection method is not limited to the above-described method. For example, the amplitude detection circuit 28 may determine whether the power-reception-side load has increased or decreased using a physical quantity (e.g., the phase difference of current or voltage or the width of a pulse generated based on a voltage waveform) other than the peak voltage.

The power reception device 40 (power reception module or secondary module) may include the secondary coil L2, the power reception section 42, the load modulation section 46, the power supply control section 48, and a power reception control device 50. Note that the power reception device 40 and the power reception control device 50 are not limited to the configuration shown in FIG. 3. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power reception section 42 are provided between the nodes NB1 and NB4. A signal CCMPI obtained by dividing the voltage between the nodes NB 1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal VD4 obtained by dividing the voltage between the nodes NB3 and NB4 using the resistors RB4 and RB5 is input to a power-reception-side control circuit 52 and a position detection circuit 56 through a signal line LP2. The divided voltage VD4 is input to the position detection circuit 56 as a frequency detection signal input (ADIN).

The load modulation section 46 performs a load modulation process. Specifically, when the power reception device 40 transmits desired data to the power transmission device 10, the load modulation section 46 variably changes the load of the load modulation section 46 (secondary side) depending on the transmission target data to change the signal waveform of the induced voltage in the primary coil L1. The load modulation section 46 includes a resistor RB3 and a transistor QB3 (N-type CMOS transistor) provided in series between the nodes NB3 and NB4.

The transistor QB3 (load-modulation transistor) is ON/OFF-controlled based on a control signal P3Q supplied from the power-reception-side control circuit 52 of the power reception control device 50 through a signal line LP3. When performing the load modulation process by ON/OFF-controlling the transistor QB3 and transmitting a signal to the power transmission device in an authentication stage before normal power transmission starts, transistor QB2 of the power supply control section 48 is turned OFF so that the battery device 90 is not electrically connected to the power reception device 40.

For example, when reducing the secondary-side load (high impedance) in order to transmit data "0", the signal P3Q is set at the L level so that the transistor QB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor QB3 is turned ON. As a result, the load of the load modulation section 46 (i.e., the load of the power reception device 40) is equivalent to the resistor RB3 (high load).

The power supply control section 48 controls power supplied to the battery device 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) as the switch circuit to be turned ON. For example, since a power loss increases due to the equivalent impedance of the regulator 49 and heat generation increases under heavy load (e.g., when it is necessary to cause an almost constant large current to steadily flow in the initial stage of charging a secondary battery which has been exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) as the switch circuit.

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON, whereby a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power reception control circuit 52 included in the power reception control device 50.

A transistor QB2 (P-type CMOS transistor) is provided between a power supply voltage (VD5) generation node NB5 (output node of the regulator 49) and a node NB6, and is controlled based on a signal P1Q from the control circuit 52 of the power reception control device 50. Specifically, the transistor QB2 is turned ON when ID authentication has been completed (established) and normal power transmission is performed.

A pull-up resistor RU2 is provided between the power supply voltage generation node NB5 and a node NB8 of the gate of the transistor QB2.

The power reception control device 50 controls the power reception device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-reception-side) control circuit 52, the position detection circuit 56, an oscillation circuit 58, the frequency detection circuit 60, and a full-charge detection circuit 62.

The power-reception-side control circuit 52 controls the power reception device 40 and the power reception control device 50. The power reception control circuit 52 may be implemented by a gate array, a microcomputer, or the like. The power-reception-side control circuit 52 operates based on a constant voltage (VD5) at the output terminal of the series regulator (LDO) 49 as a power supply voltage. The power supply voltage (VD5) is supplied to the power-reception-side control circuit 52 through a power supply line LP1.

The power-reception-side control circuit 52 performs sequence control and a determination process necessary for ID authentication, position detection, frequency detection, full-charge detection, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmission device 10 is "1" or "0".

The full-charge detection circuit 62 (charge detection circuit) detects whether or not the battery 94 of the battery device 90 has been fully charged (charged). Specifically, the full-charge detection circuit 62 detects the full-charge state by detecting whether a light-emitting device LED used to indicate the charge state is turned ON or OFF, for example. The full-charge detection circuit 62 determines that the battery 94 has been fully charged (charging has been completed) when the light-emitting device LED has been turned OFF for a given period of time (e.g., five seconds).

The charge control device 92 provided in the battery device 90 also detects the full-charge state based on the ON/OFF state of the light-emitting device LED.

The battery device 90 includes the charge control device 92 that controls charging of the battery 94 and the like. The charge control device 92 detects the full-charge state based on the ON/OFF state of the light-emitting device (LED). The charge control device 92 (charge control IC) may be implemented by an integrated circuit device or the like. The battery 94 may be provided with the function of the charge control device 92. In this case, the battery 94 corresponds to the battery device (load device) 90 in this specification.

The power reception device 40 includes four terminals (TA1 to TA4), as described above with reference to FIG. 2. The battery device 90 also includes four terminals (TA5 to TA8). The power reception control device 50 includes two terminals (i.e., ICUTX signal output terminal TA3 and LEDR signal input terminal TA4).

Note that the battery device 90 is not limited to a secondary battery. For example, a given circuit may serve as a load when the circuit operates. The details of takeover state detection (measures against takeover heat generation) are described below.

Measures Against Takeover Heat Generation

A large foreign object may be inserted between the primary coil and the secondary coil after the instrument has been authenticated and normal power transmission has started. A small or medium-sized metal foreign object can be detected by monitoring the induced voltage in the primary coil (L1).

However, when a metal foreign object (e.g., thin metal sheet) that blocks the primary coil and the secondary coil has been inserted between the primary-side instrument and the secondary-side instrument (see FIGS. 5A and 5B), the energy transmitted from the primary-side instrument is consumed by the metal foreign object (i.e., the metal foreign object acts as a load). Therefore, the primary-side instrument regards the metal foreign object as the battery (secondary-side instrument). Accordingly, a situation in which removal of the secondary-side instrument cannot be detected based on the induced voltage in the primary coil may occur, for example. In this case, power transmission from the primary-side instrument is continuously performed although the secondary-side instrument is absent, whereby the temperature of the metal foreign object increases to a large extent.

A phenomenon in which a metal foreign object takes over the secondary-side instrument in this way is hereinafter referred to as "takeover (phenomenon)". A phenomenon in which heat is generated due to the takeover state is hereinafter referred to as "takeover heat generation".

In order to improve the safety and the reliability of the non-contact power transmission system to a practical level, it is necessary to take sufficient measures against such takeover heat generation.

A foreign object may be inserted accidentally or intentionally. When a foreign object has been inserted, a skin burn or damage to or destruction of the instrument may occur due to heat generation. Therefore, sufficient safety measures against foreign object insertion must be taken for the non-contact power transmission system. Measures against takeover heat generation are described in detail below.

Figure 5A:
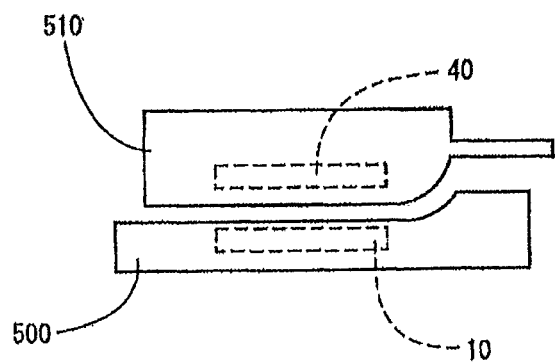
FIGS. 5A and 5B are cross-sectional views of electronic instruments that form a non-contact power transmission system which are illustrative of foreign object insertion (takeover state) after normal power transmission has started.
Figure 5B:
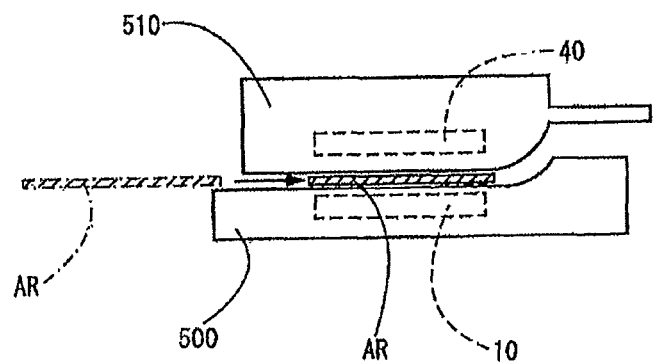

FIGS. 5A and 5B are cross-sectional views showing electronic instruments that form a non-contact power transmission system which are illustrative of insertion of a foreign object (takeover state) after normal power transmission has started.

In FIG. 5A, the portable telephone 510 (electronic instrument including the power reception device 40) is placed at a given position on the cradle 500 (electronic instrument including the power transmission device 10). Non-contact power transmission is performed from the cradle 500 (charger) to the portable telephone 510 through the primary coil and the secondary coil so that the secondary battery (e.g., battery pack) provided in the portable telephone 510 is charged.

In FIG. 5B, a thin sheet-shaped metal foreign object (conductive foreign object) AR is intentionally inserted between the cradle 500 (charger) and the portable telephone 510 during normal power transmission. When the foreign object AR has been inserted, power supplied from the primary-side instrument (cradle 500) to the secondary-side instrument (portable telephone terminal 510) is almost entirely consumed by the foreign object (AR) (i.e., the transmitted power is taken over), whereby the foreign object AR is likely to generate heat. When the state shown in FIG. 5B has occurred, the power transmission device 10 included in the primary-side instrument (cradle 500) must detect insertion of the foreign object AR and immediately stop normal power transmission.

However, it is difficult to detect the takeover state shown in FIG. 5B using a metal foreign object detection method based on the induced voltage in the primary coil (L1).

For example, the amplitude of the voltage induced in the primary coil (L1) increases as the load of the power reception device increases, and decreases as the load of the power reception device decreases. If the secondary battery of the portable telephone 510 is normally charged, the load of the power reception device 40 gradually decreases with the passage of time. When the load of the power reception device 40 has rapidly increased, the power transmission device 10 can detect the rapid increase in load since the power transmission device 10 monitors a change in the load of the power reception device 40. However, the power transmission device 10 cannot determine whether the increase in load has occurred due to the battery (the secondary battery of the portable telephone), mispositioning between the portable telephone 510 and the cradle 500, or insertion of a foreign object. Therefore, insertion of a foreign object cannot be detected using the method in which the power transmission device 10 merely detects a change in the load of the power reception device 40.

In this embodiment, the power reception device 40 intermittently changes the load of the power reception device 40 during normal power transmission while supplying power to the battery (e.g., secondary battery) (regular load modulation operation) to transmit information to the power transmission device 10.

The following items are confirmed when the power transmission device 10 has detected the information due to an intermittent change in load at a given timing.

(1) The instrument (i.e., portable telephone 510) including the power reception device 40 is appropriately placed on the instrument (i.e., cradle 500) including the power transmission device 10.

(2) The instrument (including the secondary battery of the portable telephone 510) including the power reception device 40 is operating normally.

(3) The foreign object AR is not inserted.

When the foreign object AR has been inserted during normal power transmission, the information transmitted from the power reception device 40 is blocked by the foreign object AR and does not reach the power transmission device 10. Specifically, the power transmission device 10 cannot detect an intermittent (e.g., regular) change in the load of the power reception device. It is most likely that an intermittent change in load cannot be detected after the above-mentioned items (1) to (3) have been confirmed because the foreign object AR has been inserted (item (3)). Specifically, the power transmission device 10 can determine that the power transmission device 10 has become unable to detect an intermittent change in load due to insertion of the foreign object AR.

Figure 6A:
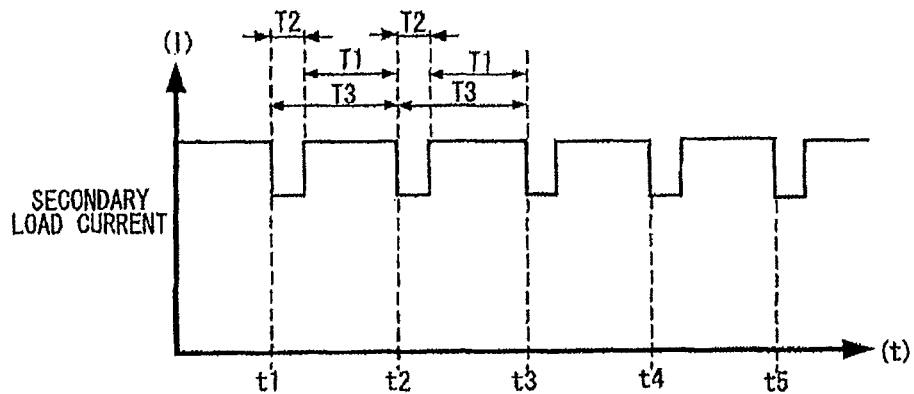
FIGS. 6A and 6B are views illustrative of a specific embodiment when intermittently changing a load of a power reception device so that insertion of a foreign object can be detected.
Figure 6B:
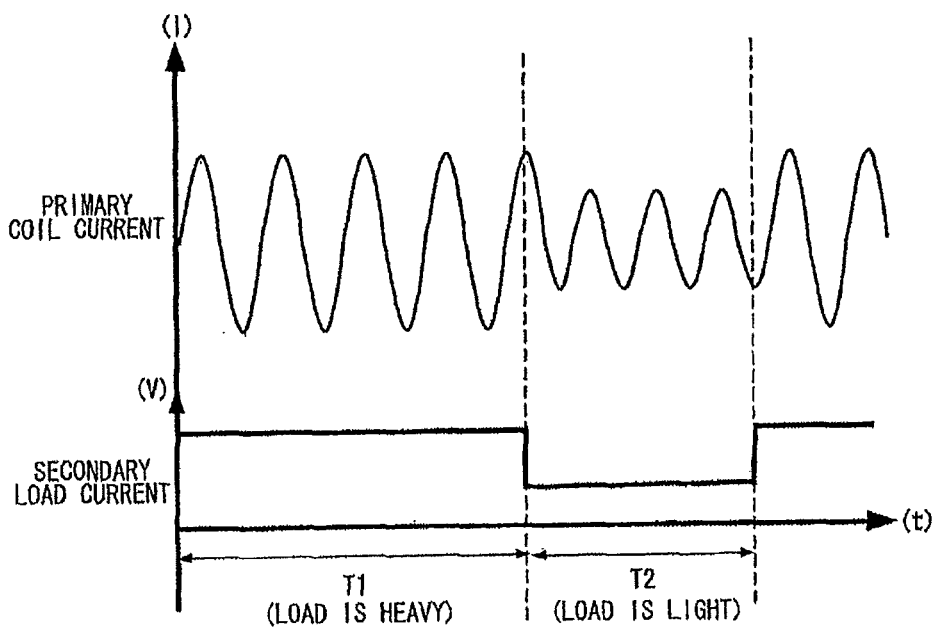

FIGS. 6A and 6B are views illustrative of a specific embodiment when intermittently changing the load of the power reception device so that insertion of a foreign object can be detected.

In FIG. 6A, an intermittent change in the load of the power reception device is indicated by a change in secondary current (current that flows through the secondary coil L2). As shown in FIG. 6A, the load of the power reception device intermittently changes at times t1, t2, t3, t4, t5, . . . .

In FIG. 6A, the load changes in a cycle T3. The load decreases in a period T2 starting from the time t1, and increases in the subsequent period T1, for example. Such a cyclic change in load is repeated in the cycle T3.

FIG. 6B shows a change in primary coil voltage (induced voltage at one end of the primary coil) with respect to a change in secondary load current. The secondary-side load increases in the period T1, and decreases in the period T2, as described above. The amplitude (peak value) of the induced voltage (primary coil voltage) at one end of the primary coil (L1) changes corresponding to the change in secondary-side load. Specifically, the amplitude increases in the period T1 in which the load increases, and decreases in the period T2 in which the load decreases. Therefore, the power transmission device 10 can detect a change in the load of the power reception device 40 by detecting the peak of the primary coil voltage using the waveform monitoring circuit 14 (see FIG. 3), for example. Note that the load change detection method is not limited to the above-described method. For example, the phase of the primary coil voltage or the primary coil current may be detected.

The load can be easily modulated by switching the transistor, for example. The peak voltage of the primary coil or the like can be accurately detected using an analog or digital basic circuit. Therefore, the above method does not impose load on the instrument to a large extent while facilitating implementation. The above-described method is also advantageous in terms of a reduction in mounting area and cost.

As described above, insertion of a foreign object can be easily and accurately detected without adding a special configuration by employing a novel method in which the power reception device 40 transmits information obtained by intermittently (and cyclically) changing the load during normal power transmission and the power transmission device 10 detects the change in load.

Specific Example of Detection of Foreign Object Insertion

Figure 7:
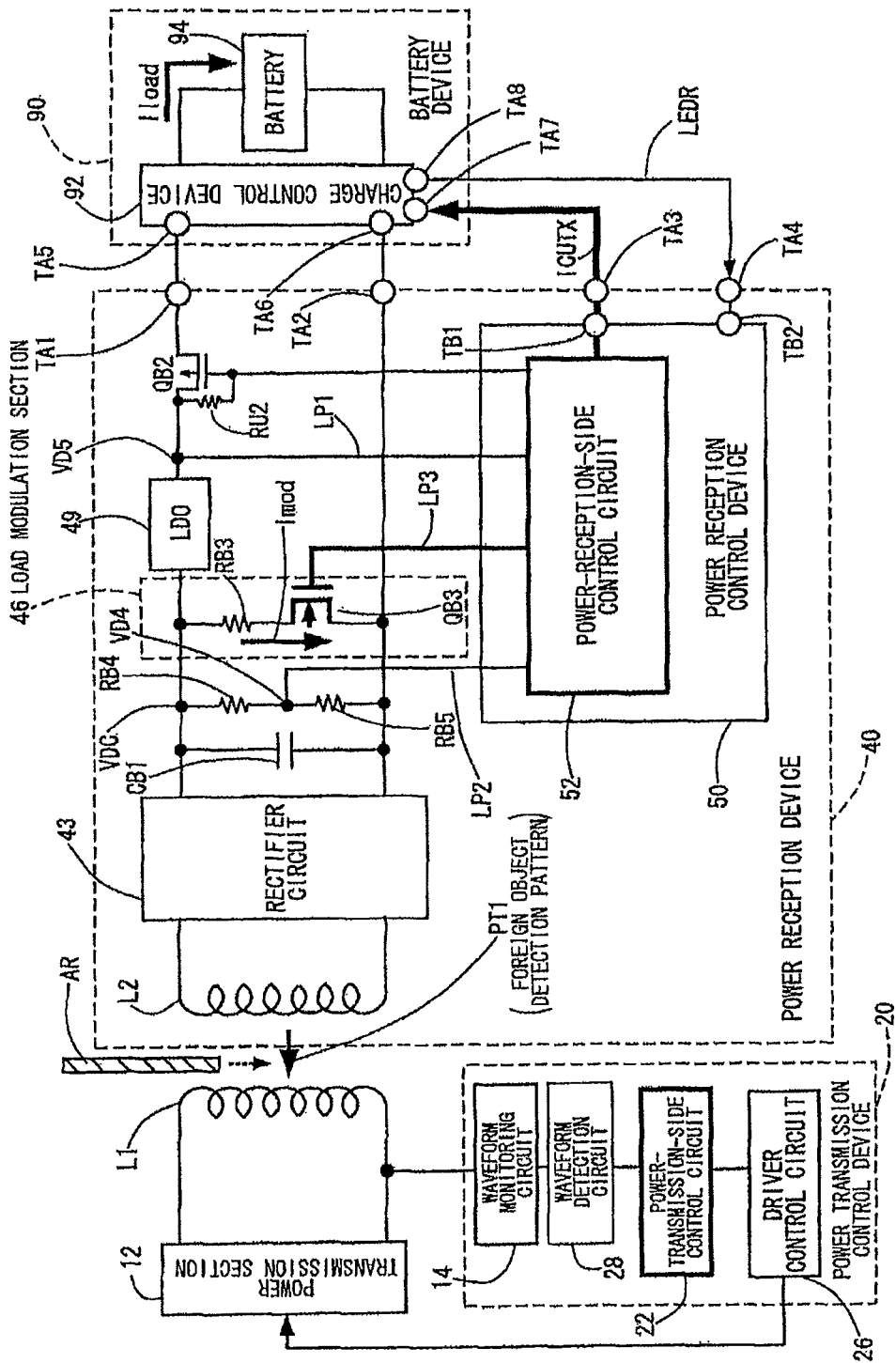
FIG. 7 is a circuit diagram showing an outline of the configuration of a non-contact power transmission system having a function of detecting a takeover state.

FIG. 7 is a circuit diagram showing the configuration of the non-contact power transmission system shown in FIG. 2 relating to detection of foreign object insertion (takeover state). In FIG. 7, the same sections as in FIG. 2 are indicated by the same reference symbols. In FIG. 7, a bold line indicates a portion that plays an important role in detecting insertion of a foreign object.

A notable circuit configuration of the power reception device 40 shown in FIG. 7 includes the load-modulation transistor QB3 of the load modulation section 46, the power supply control transistor QB2 of the power supply control section 48, and the power reception control circuit 52 that ON/OFF-controls these transistors (QB2 and QB3). The voltages at the input terminal and the output terminal of the series regulator (LDO) 49 are input to the power-reception-side control circuit 52 through the signal lines LP2 and LP1 so that the load state (degree of load) of the battery (secondary battery) 94 included in the battery device 90 can be detected by monitoring the voltage across the series regulator (LDO) 49.

The power transmission device 10 detects the peak value (amplitude) of the induced voltage in the primary coil (L1) using the waveform detection circuit 28, and detects a change in the load of the power reception device 40 using the power-transmission-side control circuit 22.

In FIG. 7, the power reception device 40 modulates the load during normal power transmission (continuous power transmission after authentication), and transmits a foreign object detection pattern PT1 to the power transmission device 10. The power-transmission-side control circuit 22 of the power transmission device 10 (successively or intermittently) monitors a change in the load of the power reception device 40 during normal power transmission. The power-transmission-side control circuit 22 determines that the foreign object AR has been inserted when the power-transmission-side control circuit 22 has become unable to receive the foreign object detection pattern PT1, and stops normal power transmission.

Specific Embodiment of Foreign Object Detection Pattern PT1

Figure 8A:
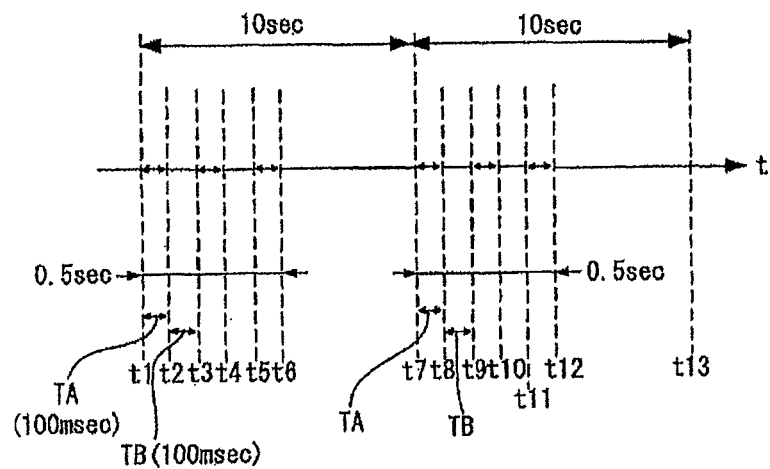
FIGS. 8A and 8B are views illustrative of a specific preferred embodiment of load modulation that enables foreign object detection.
Figure 8B:
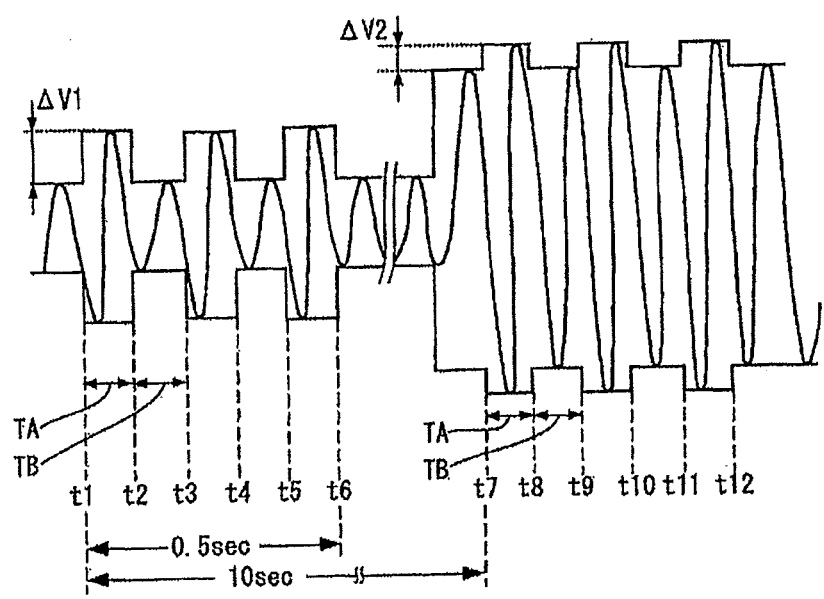

FIGS. 8A and 8B are views illustrative of a preferred and specific mode of load modulation which enables detection of a foreign object. FIG. 8A is a view showing a timing example of load modulation, and FIG. 8B is a view showing a change in the load of the power reception device detected by the power transmission device in detail.

As shown in FIG. 8A, load modulation that enables foreign object detection is cyclically (regularly) performed in a cycle of 10 sec, for example.

Load modulation that enables foreign object detection is performed in a period from time t1 to t6 and a period from time t7 to t12. The period from time t1 to t6 (from time t7 to t12) is 0.5 sec. The degree of load is changed in units of 0.1 sec (100 msec) obtained by equally dividing 0.5 sec by five.

In FIG. 8A, a bold bidirectional line indicates a period in which the load increases. Specifically, the load increases in a period from time t1 to t2, a period from time t3 to t4, a period from time t5 to t6, a period from time t7 to t8, a period from time t9 to t10, and a period from time t11 to t12. A period in which the load increases is referred to as a period TA.

The load decreases in a period from time t2 to t3, a period from time t4 to t5, a period from time t8 to t9, and a period from time t10 to t11. A period in which the load decreases is referred to as a period TB.

In FIG. 8A, the load of the power reception device is intermittently changed cyclically (i.e., in cycle units (in units of one cycle)) during normal power transmission, and the load is intermittently changed a plurality of times at given intervals within one cycle.

The power transmission device 10 and the power reception device 40 can transfer the information relating to a change in load in synchronization by cyclically changing the load (i.e., the power transmission device 10 can easily determine the timing at which the load of the power reception device 40 changes).

The power transmission device 10 can easily determine whether a change in load is noise or a normal signal when detecting a change in load by intermittently changing the load a plurality of times at given intervals within one cycle, whereby the foreign object detection accuracy can be increased. Specifically, when the load changes only once within one cycle, it may be difficult to determine whether a change in load with respect to the power transmission device 10 occurs accidentally or due to load modulation. On the other hand, when the load changes a plurality of times within one cycle, it is easy to determine that the change in load has occurred due to load modulation.

In FIG. 8A, the load is intermittently changed a plurality of times at given intervals only in a given period (times t1 to t6) within one cycle (e.g., times t1 to t7). Specifically, load modulation is performed only in the first period (0.5 sec) of one cycle (10 sec). The reasons that load modulation is performed in this manner are as follows.

Specifically, since a change in load (load modulation) during normal power transmission may affect power supply to the battery 94, it is undesirable to frequently change the load to a large extent. Therefore, one cycle of load modulation is increased to some extent (a foreign object can be detected even if the cycle of load modulation is increased to some extent).

The load is intermittently changed a plurality of times at given intervals only in a given period within one cycle. Specifically, when the load change interval is increased to a large extent, the power transmission device may not appropriately detect an intermittent change in the load of the power reception device due to a change in the load state of the battery with the passage of time or a change in surrounding conditions. Therefore, one cycle is increased (10 sec in FIG. 8A), and the load is intermittently modulated a plurality of times (five times in FIG. 8A) only in a short period (0.5 sec in FIG. 8A) within one cycle, for example.

The power transmission device 10 can detect a foreign object (AR) with high accuracy while minimizing an effect on power supply to the battery (power-supply-target load) 94 (e.g., charging of a battery pack) by performing load modulation in this manner.

FIG. 8B shows an example of a change in the amplitude of the induced voltage at one end of the primary coil (L1) of the power transmission device 10 corresponding to the load of the power reception device. In FIG. 8B, the load state of the battery 94 differs between a load modulation period (t1 to t6) in the first cycle and a load modulation period (t7 to t12) in the second cycle. The load state of the battery 94 increases in the second cycle so that the peak value of the primary coil voltage increases.

At times t1 to t6 in FIG. 8B, the difference between the primary coil voltage in the period TA in which the load increases and the primary coil voltage in the period TB in which the load decreases is $\Delta V1$. The power-transmission-side control circuit 22 of the power transmission device 10 can detect a change in the load of the power reception device 40 from the difference $\Delta V1$ in the amplitude of the primary coil voltage.

In the second load modulation period (times t7 to t12), since the load state of the battery 94 increases so that a charging current (Iload) supplied to the battery 94 increases, the ratio of a modulation current (Imod) due to load modulation to the charging current (Iload) decreases so that the difference in primary coil voltage caused by causing the modulation current (Imod) to be turned ON/OFF decreases to $\Delta V2$ ($\Delta V2<\Delta V1$). Specifically, the modulation current (Imod) is buried in the charging current (Iload) supplied to the battery 94. Therefore, when the load state of the battery 94 is heavy, it is difficult for the power transmission device 10 to detect a change in load as compared with the case where the load state of the battery 94 is light.

In this embodiment, the load state of the battery 94 is reduced by reducing power supplied to the battery 94 so that the primary-side instrument can easily detect a change in load due to load modulation. The battery load reduction measures are described below.

Process of Reducing Load State of Battery

In the invention, since load modulation is performed while transmitting power to the battery 94 during normal power transmission, transmission of a signal due to load modulation to the power transmission device 10 is necessarily affected by the state of power supply to the battery 94 (i.e., the load state of the battery).

As described above, even if a small current is turned ON/OFF for load modulation when a large amount of charging current is supplied to the battery 94 (e.g., battery pack), since the amount of ON/OFF current (Imod) is smaller than the amount of charging current (Iload) supplied to the battery 94, it is difficult for the power transmission device 10 to detect a change in load due to load modulation (i.e., it is difficult for the power transmission device 10 to detect whether a change in load is noise or a signal due to load modulation). On the other hand, the relative ratio of the ON/OFF current (Imod) due to load modulation increases when the amount of current supplied to the load 94 is small (when the load of the battery is light), so that the power transmission device 10 can easily detect a change in load due to the ON/OFF operation.

Therefore, the power reception device 40 monitors the load state of the battery 94 during normal power transmission, and reduces the amount of power supplied to the battery 94 when the load state of the battery 94 is heavy (i.e., a large amount of current is supplied to the battery 94) when the power reception device 40 performs load modulation that enables foreign object detection.

Since the load state of the battery 94 is apparently reduced by reducing the amount of power supplied to the battery 94, the power transmission device 10 can easily detect a signal due to load modulation. Therefore, the foreign object detection accuracy is maintained at a desired level even when the load state of the battery 94 is heavy. Since at least a minimum amount of power is always supplied to the battery 94 even when compulsorily reducing the load state of the battery 94, a problem in which the electronic circuit (charge control device 92) of the battery 94 cannot operate does not occur.

Moreover, since load modulation that enables detection of foreign object insertion is intermittently performed at appropriate intervals taking the effect on power supply to the battery 94 into consideration, power supply to the battery 94 is not adversely affected even if the load is reduced. For example, a problem in which the charging time of the battery pack increases to a large extent does not occur.

Therefore, the load change detection accuracy of the power transmission device 10 can be maintained at a desired level, even if the load state of the battery 94 is heavy, by causing the power reception device 40 to monitor the state of the battery 94 and optionally reduce the load state of the battery 94 when performing load modulation that enables detection of foreign object insertion.

Note that the load reduction process may be uniformly performed regardless of the load state of the battery 94. This makes it unnecessary to monitor the load state of the battery so that load imposed on the power-reception-side control circuit 52 is reduced.

FIGS. 9A to 9E are views illustrative of the battery load reduction operation. FIG. 9A is a view showing a state in which the load state of the battery is light. FIG. 9B is a view showing a state in which the load state of the battery is heavy. FIG. 9C is a view showing a change in primary coil voltage in the state shown in FIG. 9B. FIG. 9D is a view showing a state in which the load state of the battery is reduced by causing the power supply control transistor to be turned ON/OFF or setting the power supply control transistor in a half ON state. FIG. 9E is a view showing a change in primary coil voltage in the state shown in FIG. 9D.

In FIG. 9A, since the load state of the battery 94 is light (i.e., the charging current Iload supplied to the battery is small), the power transmission device 10 can sufficiently detect a change in load due to load modulation without causing the power reception device 40 to reduce the load state of the battery. Therefore, the power supply control transistor QB2 is always turned ON. The load modulation transistor QB3 is intermittently turned ON/OFF to implement load modulation.

In FIG. 9B, since the load state of the battery 94 is heavy (i.e., the charging current Iload supplied to the battery is large), a change in modulation current (Imod) due to the ON/OFF operation is observed to only a small extent. As shown in FIG. 9C, when the load state of the battery has increased, the difference in amplitude of the primary coil voltage decreases from ΔV1 to ΔV2, whereby it becomes difficult to detect a change in load due to load modulation.

In FIG. 9D, the power reception device 40 reduces the load state of the battery when performing load modulation. In FIG. 9D, the power reception device 40 causes the power supply control transistor QB2 to be successively turned ON/OFF or sets the power supply control transistor QB2 in a half ON state.

Specifically, the amount of power supplied to the battery 94 can be reduced by utilizing a digital method in which the power reception device 40 causes the power supply control transistor QB2 provided in a power supply path to be successively turned ON/OFF to intermittently supply power to the battery 94. An operation of successively switching a transistor is generally employed for a digital circuit, and is easily implemented. Moreover, it is possible to accurately reduce the amount of power supplied to the battery by selecting the switching frequency.

The amount of power supplied to the battery 94 can also be reduced by utilizing an analog method in which an intermediate voltage between a complete ON voltage and a complete OFF voltage is supplied to the gate of the power supply control transistor (PMOS transistor) to set the PMOS transistor in a half ON state. This method has an advantage in that the on-resistance of the power supply control transistor (PMOS transistor) can be finely adjusted by controlling the gate voltage.

In FIG. 9E, the amplitude of the primary coil voltage in a state in which the load state of the battery is heavy changes from V10 to V20 by compulsorily reducing the load state of the battery. In FIG. 9E, "X" indicates the amount by which the load state of the battery 94 is reduced. The difference in amplitude of the primary coil voltage increases from ΔV2 (see FIG. 9C) to ΔV3 (ΔV3>ΔV2) by compulsorily reducing the load state of the battery 94, whereby the power transmission device 10 can easily detect a change in the load of the power reception device 40 due to load modulation.

The power transmission device can reliably detect a change in load, even when the load state of the battery is heavy, by causing the power reception device to reduce the load state of the battery while performing load modulation.

Load Modulation Timing and Load Reduction Timing

Figure 10A:
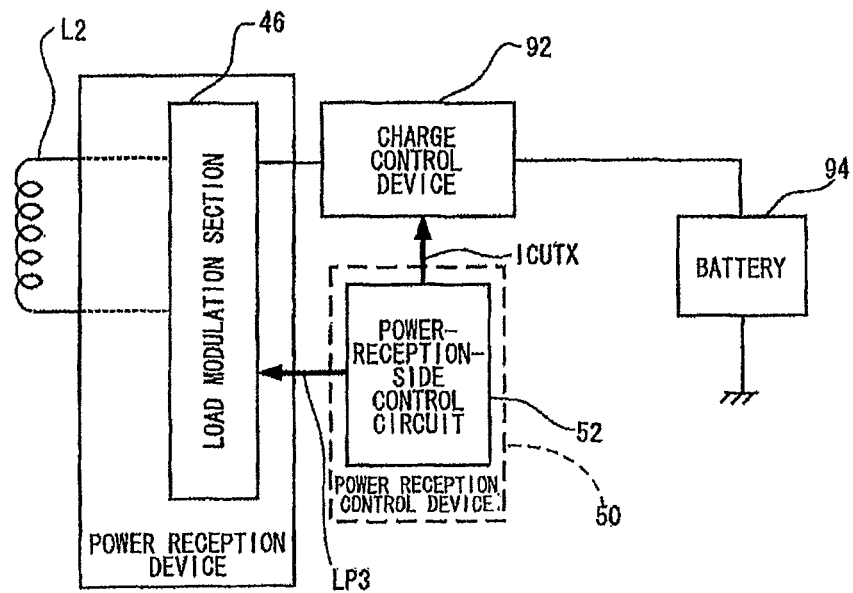
FIGS. 10A and 10B are views illustrative of a load modulation timing and a load reduction timing.
Figure 10B:
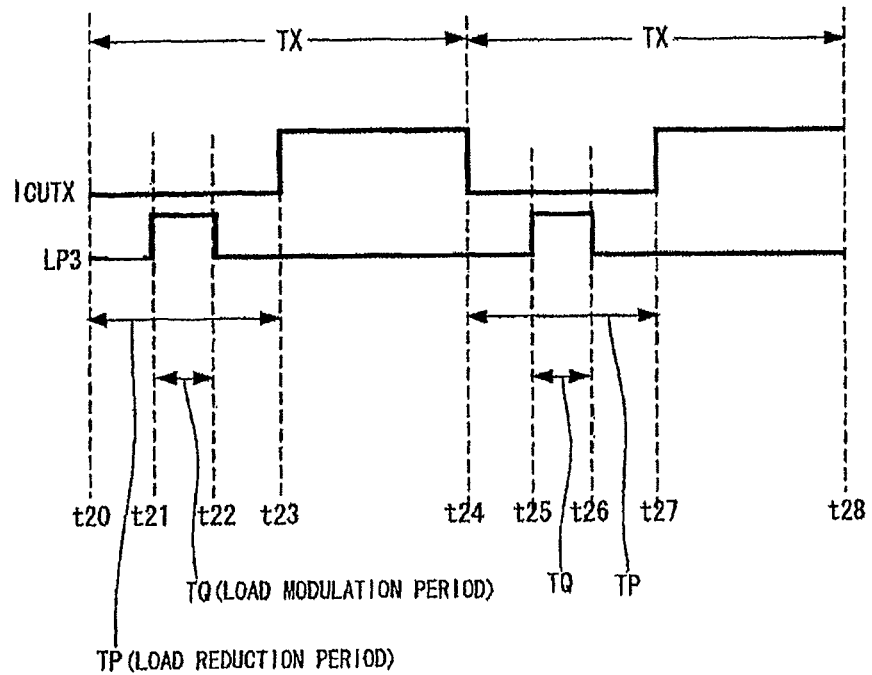

FIGS. 10A and 10B are views illustrative of the load modulation timing and the load reduction timing.

As shown in FIG. 10A, the power-reception-side control circuit 52 provided in the power reception control device 50 causes the load modulation section 46 provided in the power reception device 40 to perform load modulation using a load modulation signal (LP3) while reducing the load state of the battery 94 by controlling the operation of the charge control device 92 using the power supply control signal (ICUTX).

As shown in FIG. 10B, intermittent load modulation is regularly (cyclically) performed in a cycle TX. The power control signal (ICUTX) is set at the low level in a first period (t20 to t23 and t24 to t27) of the load modulation period TX. Therefore, the operation of the charge control device 92 is compulsorily controlled so that the charging current supplied to the battery 94 is reduced or temporarily stopped.

When reducing the charging current (i.e., the charging current is not turned OFF), an increase in charging time can be minimized since the battery 94 is continuously charged. Moreover, since a CPU provided in the charge control device 92 is not reset, the normal operation of the charge control device 92 can be maintained When temporarily stopping the charging current, the charging time increases to some extent since charging of the battery is temporarily stopped. On the other hand, since the effect of battery charging on the load modulation signal is completely eliminated, the power transmission device 10 (primary-side instrument) can more easily detect a change in load.

It is desirable to supply a minimum amount of power that enables the CPU to operate during load reduction instead of completely stopping power supply, taking into account the charging time and the effect of preventing the CPU provided in the charge control device 92 from being reset (note that the invention is not limited thereto).

The first period (t20 to t23 and t24 to t27) of the load modulation period may be referred to as a load reduction period. The second period (t23 to t24 and t27 to t28) is referred to as a normal operation period.

As shown in FIG. 10B, the load modulation signal LP3 is activated in an intermediate period (t21 to t22 and t25 to t26) of the load reduction period so that load reduction is performed. When the load-modulation transistor QB3 shown in FIG. 7 is turned ON, the modulation current (Imod) flows so that the load with respect to the primary-side instrument (i.e., the load of the secondary-side instrument) increases apparently. When the load-modulation transistor QB3 is turned OFF, the low-load (or no-load) state is recovered.

Specifically, the load with respect to the primary-side instrument (i.e., the load of the secondary-side instrument) changes in the order of "light", "heavy", and "light". The primary-side instrument detects such a specific change in load. The primary-side instrument determines that a takeover state due to a foreign object insertion has occurred when the primary-side instrument cannot detect a regular change in load, and stops power transmission. The primary-side instrument can easily detect a change in load by reducing the load.

Internal Configuration and Operation of Charge Control Device

A specific embodiment when controlling battery charging using the power supply control signal (ICUTX) is described below with reference to FIGS. 11 to 14. An example that adjusts a current regulation resistor, an example that utilizes negative feedback control, and an example that directly controls power supply through a power supply path, are given below in that order.

Figure 11A:
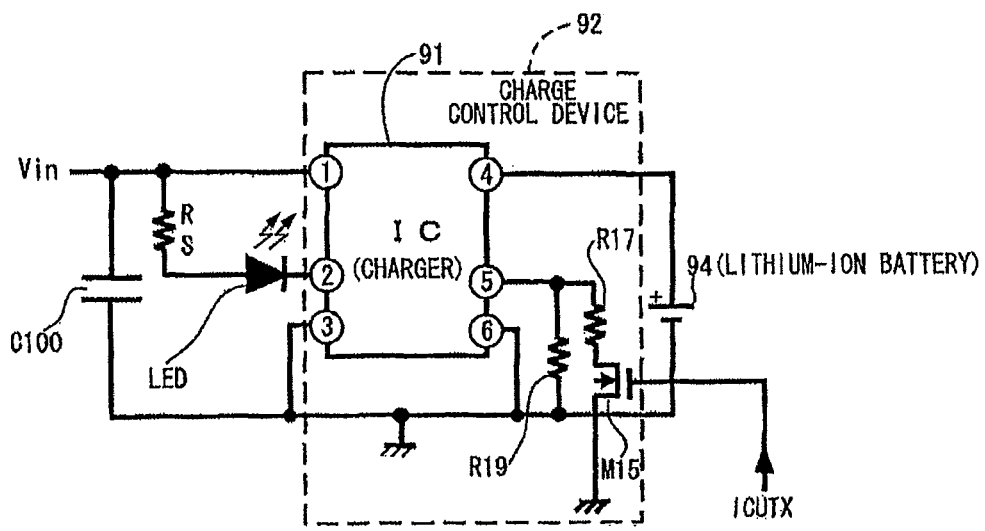
FIGS. 11A and 11B are views illustrative of an example of battery charge control (example that uses a current regulation resistor).
Figure 11B:
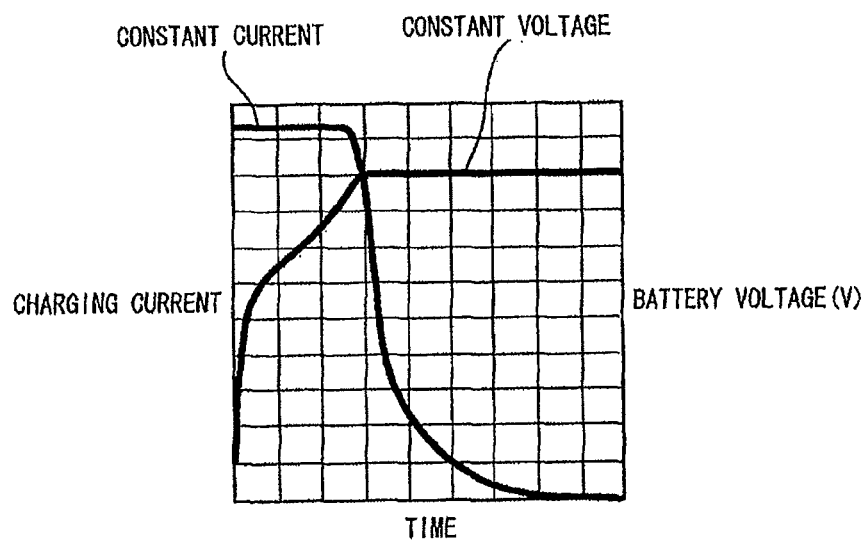

(1) Example that Adjusts Current Regulation Resistor (e.g., External Resistor) Using Signal ICUTX FIGS. 11A and 11B are views illustrative of an example of battery charge control (example that uses a current regulation resistor). FIG. 11A shows a connection state of a charger (charge control IC) 91, current regulation resistors (R19 and R17), and the like included in the charge control device 92. FIG. 11B shows the charging characteristics of the battery 94 (e.g., lithium-ion battery).

As shown in FIG. 11A, the charger (charge control IC) 91 includes six terminals. A first terminal is a power supply terminal that receives a voltage (Vin) supplied from the power reception device 40.

A second terminal is a terminal for detecting the charge state of the battery 94. A third terminal is a terminal that receives an enable signal (EN).

A fourth terminal is a terminal for charging the battery 94. A fifth terminal is a terminal connected to the external current regulation resistors (R19 and R17). Note that the current regulation resistors (R19 and R17) may be provided in the charger (charge control IC) 91. A sixth terminal is a ground terminal The current regulation resistor (external resistor) R19 is connected between the fifth terminal of the charger (charge control IC) 91 and ground. The current regulation resistor (external resistor) R17 and an NMOS transistor (M15) as a control element (charging current control element) are connected in series between the fifth terminal of the charger (charge control IC) 91 and ground.

The NMOS transistor (M15) as the control element (charging current control element) functions as a switching element, for example. The gate of the NMOS transistor (M15) is driven using the power supply control signal (ICUTX) so that the NMOS transistor (M15) is turned ON/OFF.

When the NMOS transistor (M15) is turned ON, the current regulation resistors (R19 and R17) are connected in parallel between the fifth terminal and ground. The resistance of a combined resistor formed by the current regulation resistors (R19 and R17) connected in parallel is smaller than the resistance of the current regulation resistor R19.

When the NMOS transistor (M15) is turned OFF, the current regulation resistor R17 is disabled (i.e., only the current regulation resistor R19 is enabled).

The charging current supplied to the battery 94 decreases as the resistance of the current regulation resistors (R19 and R17) increases, and increases as the resistance of the current regulation resistors (R19 and R17) decreases. Specifically, the current regulation resistors (R19 and R17) have a function of adjusting the amount of reference current of a current mirror that determines the charging current supplied to the battery, for example. The reference current decreases as the resistance of the current regulation resistors (R19 and R17) increases so that the charging current (Iload) supplied to the battery is compulsorily reduced (i.e., the amount of power supplied is limited).

The NMOS transistor (M15) is turned ON when the power supply control signal (ICUTX) is inactive (H level), so that the current regulation resistors (R19 and R17) are connected in parallel between the fifth terminal and ground. The NMOS transistor (M15) is turned OFF when the power supply control signal (ICUTX) is activated (L level), so that only the current regulation resistor (R19) is connected to the fifth terminal. As a result, the resistance of the current regulation resistor increases. Therefore, the charging current (Iload) supplied to the battery 94 is compulsorily reduced.

It is thus possible to externally control power supplied to the battery 94 using a simple circuit by employing the above-described configuration that controls the resistance of the current regulation resistor using the power supply control signal (ICUTX).

Power supplied to the battery can be controlled using the power supply control signal (signal ICUTX) without changing the internal circuit configuration of the charger (charge control IC) 91 included in the charge control device 92 by employing the above-described configuration that utilizes an external resistor as the current regulation resistor (note that the invention is not limited thereto) and controls the resistance of the current regulation resistor using the control element (e.g., switching element). Moreover, control such as changing the charging current in a plurality of stages can be easily implemented by increasing the number of control elements (M15), for example.

As shown in FIG. 11B, the charger (charge control IC) 91 charges the battery in a constant current mode in the initial charging stage, and then transitions to a constant voltage mode.

Figure 12:
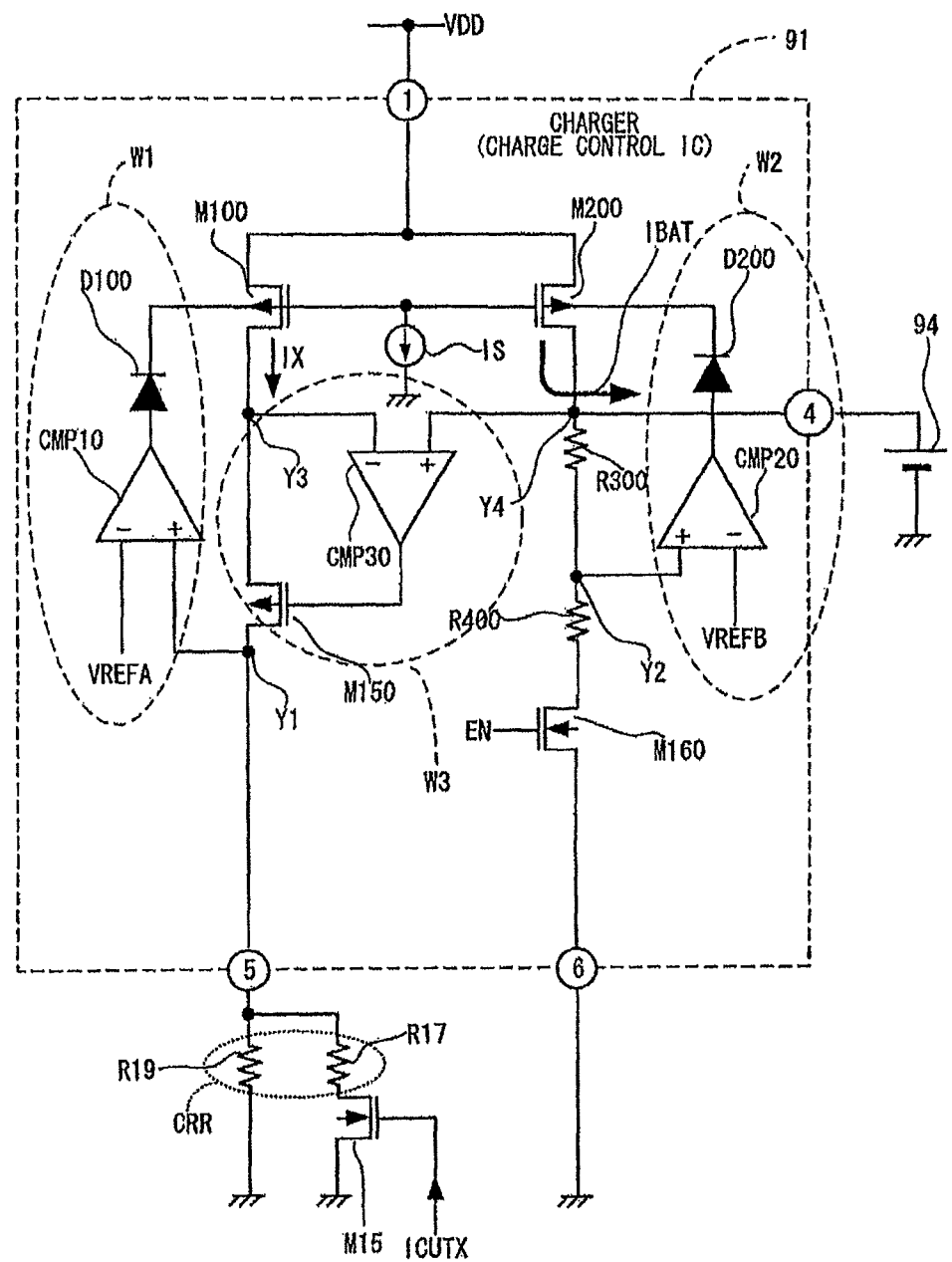
FIG. 12 is a circuit diagram showing an example of the internal circuit configuration of the main portion of a charger (charge control IC) shown in FIG. 11A.

FIG. 12 is a circuit diagram showing an example of the internal circuit configuration of the main portion of the charger (charge control IC) shown in FIG. 11. In FIG. 12, a PMOS transistor (M100) is a reference-side transistor of a current mirror, and a PMOS transistor (M200) is an output-side transistor of the current mirror.

The current mirror ratio is set at 1:205, for example. Specifically, when the reference current of the current mirror is referred to as IX and the output current (charging current of the battery) is referred to as IBAT, IBAT=205·IX.

The amount of the reference current IX of the current mirror can be programmed (adjusted) by adjusting the resistance of the current regulation resistors (CRR: R19 and R17), as described above. Therefore, the charging current IBAT (Iload) can be adjusted (reduced, increased, or stopped) by variably adjusting the resistance of the current regulation resistor (CRR) using the power supply control signal (ICUTX).

The circuit shown in FIG. 12 performs the above-described basic charging operation. Since it is necessary to automatically switch the mode between the constant current mode and the constant voltage mode, as shown in FIG. 11B, a circuit W1, a circuit W2, and a circuit W3 are provided in the charger (charge control IC) 91.

A constant current source IS is provided so that the gates of the transistors (M100 and M200) of the current mirror can be pulled down. The constant current source IS may be replaced by a grounded resistor. An NMOS transistor (M160) is a charging-enable transistor.

The circuit W1 is a negative feedback circuit that implements constant-current charging, the circuit W2 is a negative feedback circuit that implements constant-voltage charging, and the circuit W3 is an equalizer that equalizes the potentials of the drains (nodes Y3 and Y4) of the transistors (M100 and M200) of the current mirror.

A comparator CMP10 of the circuit W1 biases the gates of the transistors (M100 and M200) of the current mirror through a diode D100 so that the potential of a reference-side node Y1 of the current mirror is equal to a first reference potential VREFA. The reference current IX of the current mirror is VREFA/CRR (resistance of the current regulation resistor) (i.e., the reference current IX is made constant). Therefore, the charging current IBAT (Iload) is made constant.

Likewise, a comparator CMP20 of the circuit W2 biases the gates of the transistors (M100 and M200) of the current mirror through a diode D200 so that the potential of an output-side node Y2 of the current mirror is equal to a second reference potential VREFB. In this case, the charge voltage VBAT is VREFB(1+R300/R400) (i.e., the charge voltage is made constant).

Whether the circuit W1 or the circuit W2 is enabled is automatically determined based on the potential of the positive electrode of the battery 94. Specifically, the output of the comparator CMP20 of the circuit W2 decreases when the potential of the positive electrode of the battery 94 is low (initial charging stage). Therefore, the diode D200 is reverse-biased and turned OFF. On the other hand, the diode D100 of the circuit W1 is forward-biased so that the gates of the transistors (M100 and M200) of the current mirror are biased by the circuit W1.

The diode D200 of the circuit W2 is forward-biased when the potential of the positive electrode of the battery 94 has increased so that the gates of the transistors (M100 and M200) of the current mirror are biased by the circuit W2. In this case, the diode D100 of the circuit W1 is reverse-biased so that the circuit W1 is disabled. Specifically, when the potential of the positive electrode of the battery 94 has increased to a predetermined level (predetermined potential determined by the second reference potential VREFB), the mode automatically changes from the constant current mode to the constant voltage mode.

In the constant current mode and the constant voltage mode, the charging current (IBAT or Iload) decreases when the reference current IX of the current mirror is reduced to a large extent using the power supply control signal (ICUTX), for example. As a result, the load state of the battery is compulsorily reduced by external control.

Example that Controls Battery Charging Utilizing Negative Feedback Control Circuit of Charger (Charge Control IC)

Figure 13:
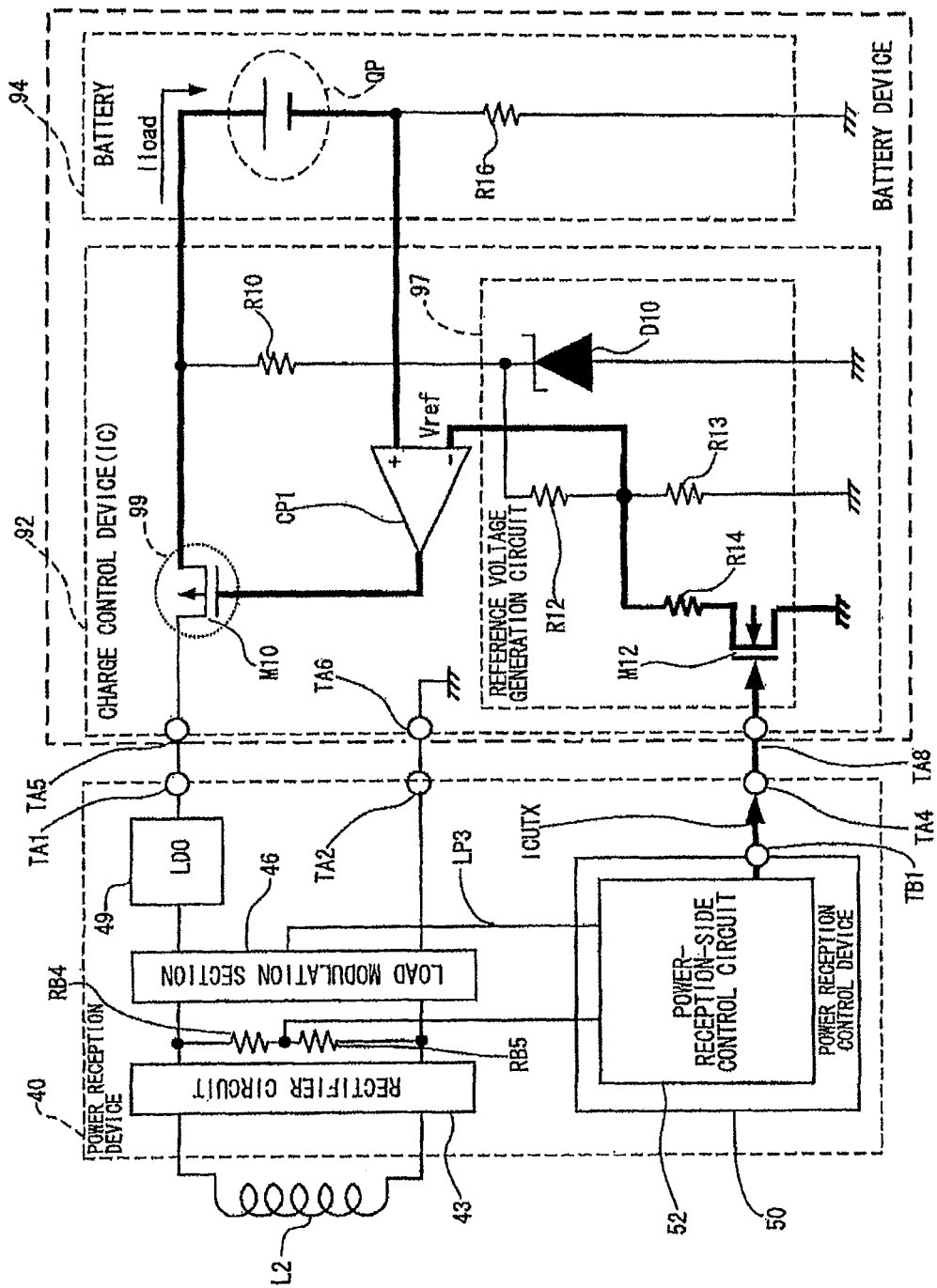
FIG. 13 is a circuit diagram illustrative of an example of a specific internal configuration and operation of a charge control device.

FIG. 13 is a circuit diagram illustrative of an example of a specific internal configuration and operation of the charge control device 92.

In the charge control device 92 shown in FIG. 13, a reference voltage (Vref) of a negative feedback control circuit for constant current control (or constant voltage control) is adjusted using the power supply control signal (ICUTX) to decrease (or increase) the charging current (load current).

The battery 94 shown in FIG. 13 includes a secondary battery QP and a charging current detection resistor (current/voltage conversion resistor) R16.

The charge control device (IC) 92 shown in FIG. 13 includes a PMOS transistor M10 (charging current regulation element) that functions as a power supply control circuit 99, a comparator CP1, and a reference voltage generation circuit 97. The charge control device (IC) 92 normally includes a CPU (not shown in FIG. 13) in order to implement highly accurate control.

The reference voltage (Vref) is supplied to an inverting terminal of the comparator CP1, and a voltage across the resistor R16 is supplied to a non-inverting terminal of the comparator CP1. The gate of the PMOS transistor 99 is driven based on an output signal from the comparator CP1, whereby the amount of current (charging current) supplied to the battery 94 is adjusted. In this case, since the voltage across the resistor R16 is made equal to the reference voltage Vref by negative feedback control, negative feedback control is performed so that a current (charging current) that flows through the resistor R16 is equal to a current corresponding to the reference voltage Vref.

A charging voltage supplied to the secondary battery QP can be adjusted to the reference voltage Vref by supplying the voltage of the positive electrode of the secondary battery QP to the non-inverting terminal of the comparator CP1 (this configuration is not shown).

The reference voltage generation circuit 97 includes a Zener diode D10, voltage-divider resistors R12 and R13, a resistor R14 and a PMOS transistor M12 for adjusting the reference voltage.

A resistor R10 and the Zener diode D10 form a constant voltage circuit. A cathode voltage of the Zener diode D10 is divided by the resistors R12 and R13, and serves as the reference voltage (Vref) input to the inverting terminal of the comparator CP1.

For example, the NMOS transistor M12 is turned OFF when the voltage supply control signal (ICUTX) from the power reception control device 50 (power-reception-side control circuit 52) is set at the low level. Therefore, a voltage obtained by dividing the cathode voltage of the Zener diode D10 using the resistors R12 and R13 serves as the reference voltage (Vref).

The NMOS transistor M12 is turned OFF when the voltage supply control signal (ICUTX) is set at the high level. Therefore, the resistors R14 and R13 are connected in parallel so that a combined resistor formed by the resistors R14 and R13 (the resistance of the combined resistor is smaller than the resistance of the resistor R13) and the resistor R12 are connected in series. Accordingly, the voltage level of the reference voltage Vref decreases so that the charging current Iload supplied to the battery 94 is reduced (including the case where the charging current is stopped), whereby the load is reduced.

Note that the above-described operation is merely an example. The invention is not limited thereto. Various embodiments may be employed for controlling the charging current Iload using negative feedback control. The charging current may be increased instead of reducing the charging current. The voltage level of the reference voltage may be changed in a plurality of stages.

In the above-described example, the reference voltage (Vref) of the comparator CP1 is adjusted. Note that the voltage (control target voltage) input to the non-inverting terminal of the comparator CP1 may be changed using the power supply control signal (signal ICUTX) without adjusting the reference voltage.

Since the charge control device 92 shown in FIG. 13 increases or decreases (adjusts) the charging current by controlling the operation of the negative feedback control circuit using the signal ICUTX, the amount of charging current can be controlled with high accuracy. Since the negative feedback control circuit originally provided in the charge control device 92 for implementing constant current control and constant voltage control is effectively utilized, load imposed on the circuit is reduced while facilitating implementation.

Figure 14:
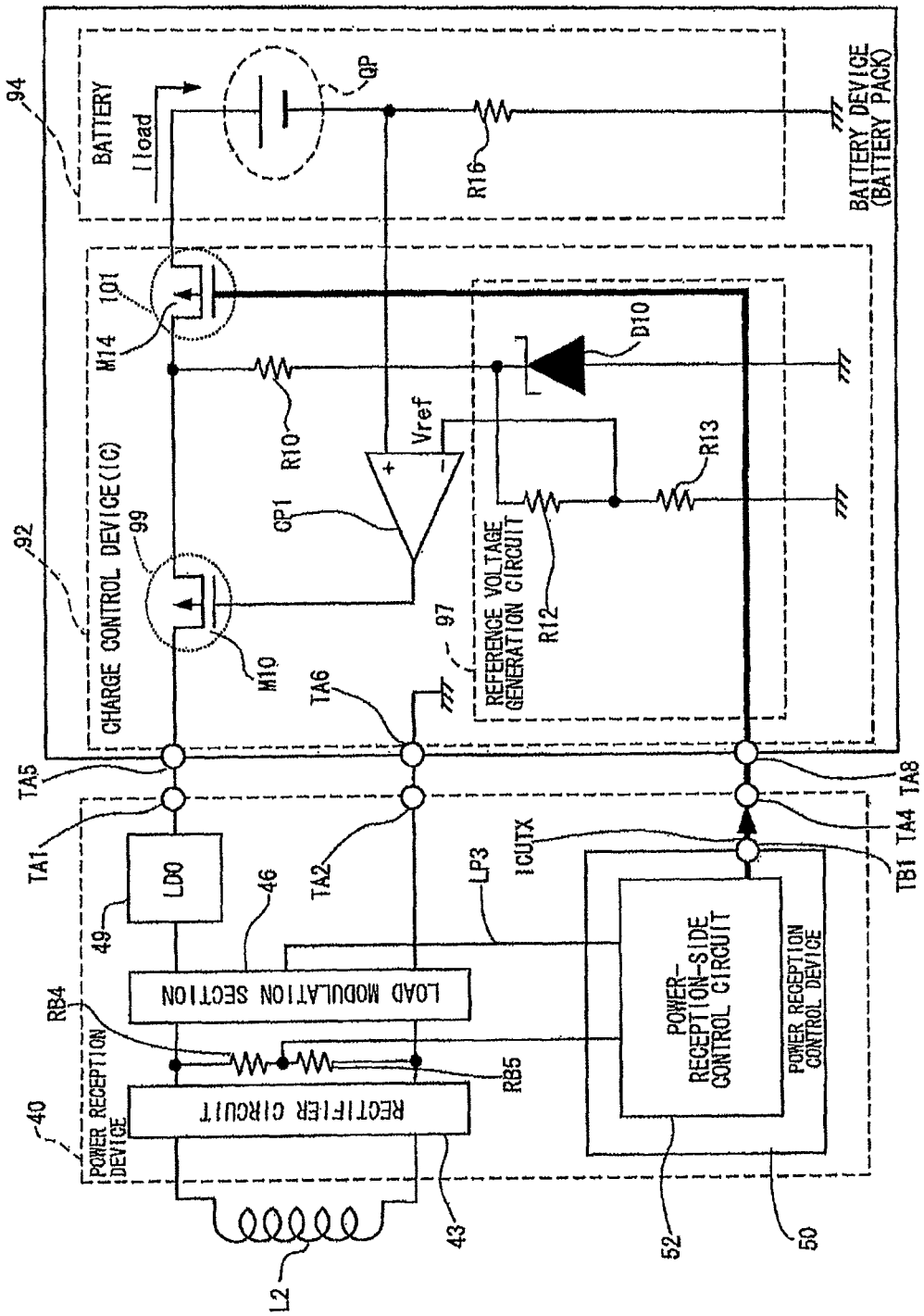
FIG. 14 is a circuit diagram illustrative of another example of a specific internal configuration and operation of a charge control device.

Example that controls charging current by providing power supply regulation circuit (e.g., current limiting element) in charging path FIG. 14 is a circuit diagram illustrative of another example of a specific internal configuration and operation of the charge control device 92.

The charge control device 92 shown in FIG. 14 employs a configuration in which a PMOS transistor M14 (current limiting element) that functions as a power supply regulation circuit 101 is provided in the power supply path, and the operation of the PMOS transistor M14 is controlled using the power supply control signal (ICUTX).

For example, when the voltage supply control signal (ICUTX) is set at the high level (during normal operation), a signal reversed using an inverter INV1 is applied to the gate of the PMOS transistor M14 so that the PMOS transistor M14 is completely turned ON, whereby the charging current Iload is supplied to the battery 94.

When the power supply control signal (ICUTX) is set at the low level (during load reduction), the PMOS transistor M14 is set in a half ON state (i.e., a conducting state between a completely OFF state and a completely ON state) or is turned OFF so that the charging current Iload is reduced to implement a low-load state or a no-load state. This embodiment has an advantage in that the circuit configuration is not complicated.

The charge control device 92 shown in FIG. 14 includes a negative feedback control circuit similar to that shown in FIG. 13. Therefore, the charge control device 92 shown in FIG. 14 can control the charging current with high accuracy during normal operation in the same manner as in FIG. 13.

Second Embodiment

This embodiment illustrates a series of sequences of the non-contact power transmission system shown in FIGS. 1 and 3.

Operation of Non-Contact Power Transmission System

Figure 15:
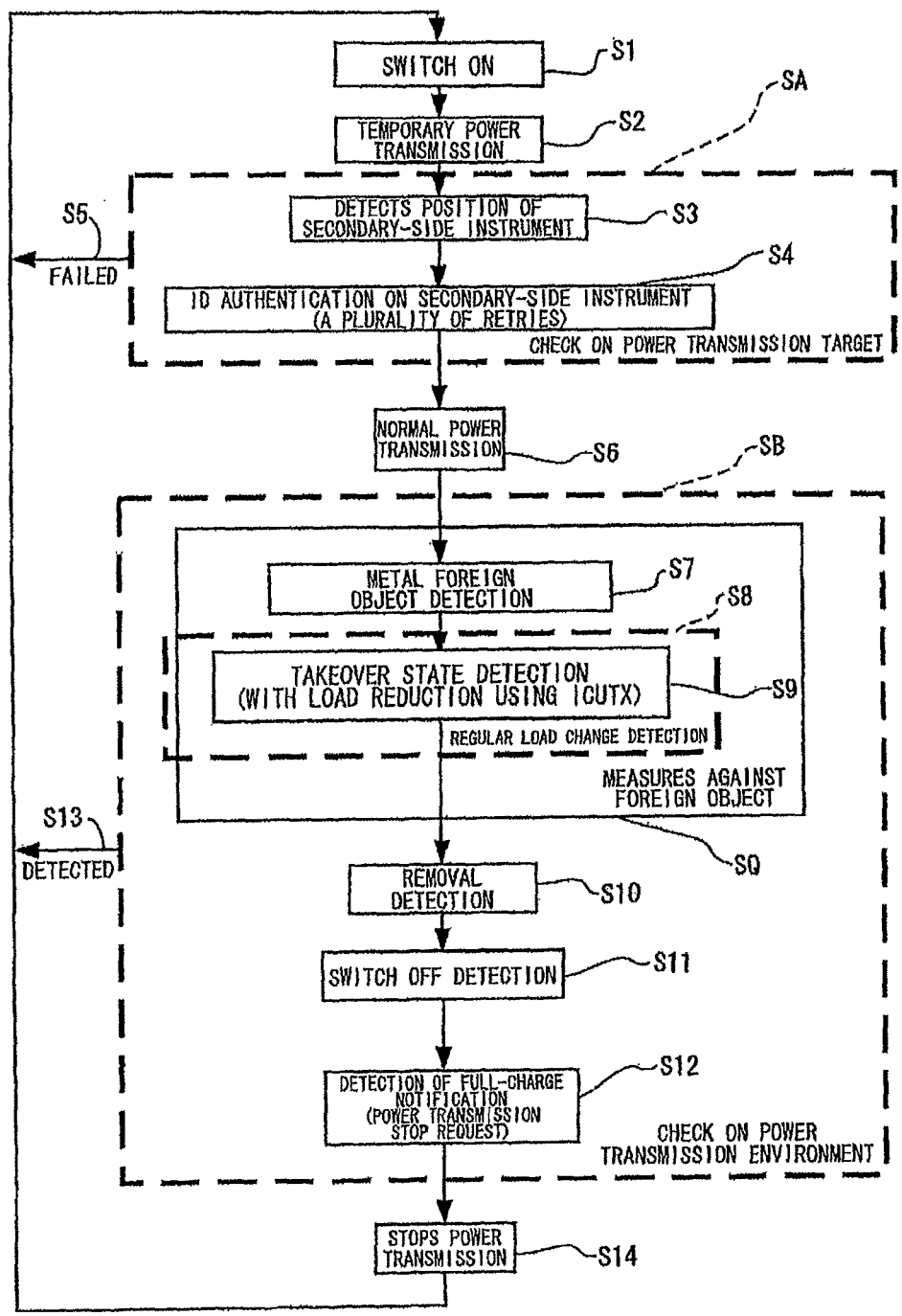
FIG. 15 is a flowchart showing an outline of an example of the operation of a power transmission device.

FIG. 15 is a flowchart showing an outline of an example of the operation of the power transmission device. The operation of the power transmission device 10 is roughly divided into a check on the power transmission target before power transmission (step SA) and a check on the power transmission environment during power transmission (including before power transmission) (step SB) (these steps are enclosed by bold dotted lines).

The power transmission device 10 starts temporary power transmission when the switch (SW) has been turned ON, as described above (steps S1 and S2).

The power transmission device 10 then checks whether or not the power-reception-side instrument (510) is placed at an appropriate position (step S3), and performs ID authentication on the power-reception-side instrument 510 (power reception device 40) to determine whether or not the power-reception-side instrument 510 is an appropriate power transmission target (step S4). A situation in which the user must again turn ON the switch (SW) due to an accidental error in ID authentication is prevented by allowing retries during ID authentication. This improves convenience to the user.

When the power transmission device 10 has failed in position detection or ID authentication (step S5), the power transmission device 10 stops temporary power transmission, and returns to the initial state in which the power transmission device 10 waits for the switch to be turned ON (i.e., a state in which the power transmission device 10 waits for the step S1 to occur).

The position detection circuit 56 included in the power reception device 40 shown in FIG. 2 checks whether or not the power-reception-side instrument is placed at an appropriate position (position detection) based on the waveform monitor signal (PHIN) of the induced voltage signal in the primary coil (L1) or a direct-current voltage (ADIN) obtained by rectifying the induced voltage in the secondary coil (L2).

Figure 21:
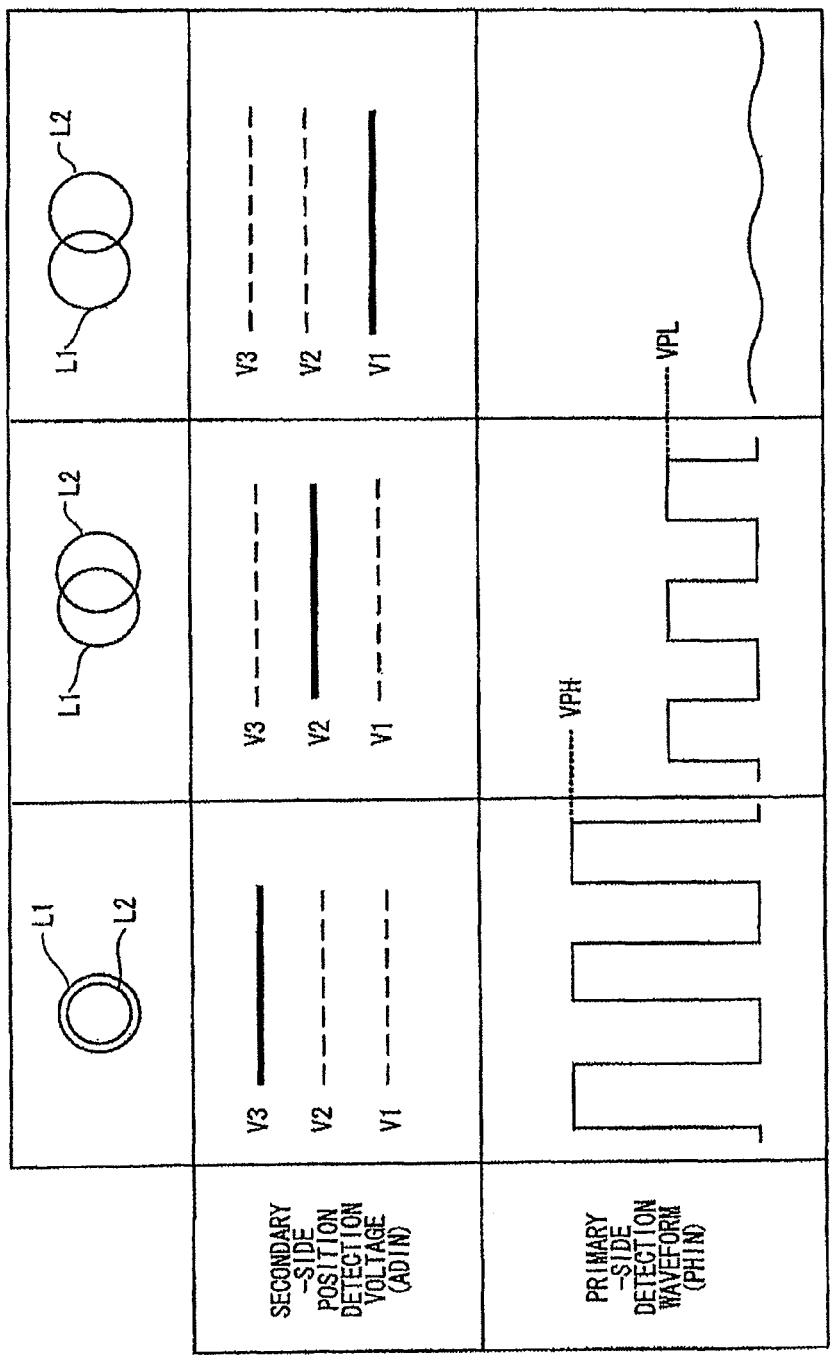
FIG. 21 is a view illustrative of the principle of position detection.
Figure 22C:
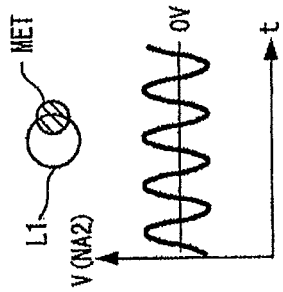
FIGS. 22A to 22F are views illustrative of the principle of metal foreign object (conductive foreign object) detection.
Figure 22B:
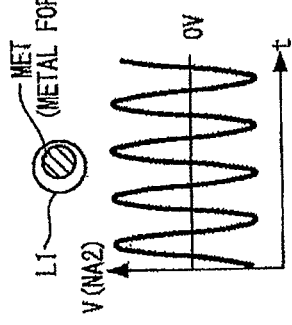
Figure 22A:
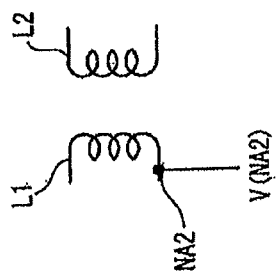
Figure 22F:
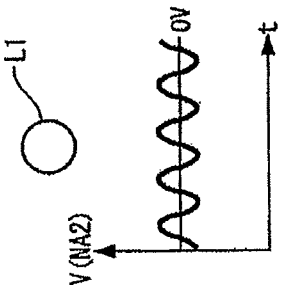
Figure 22E:
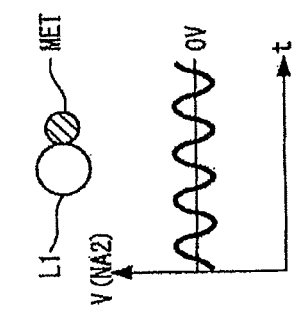
Figure 22D:
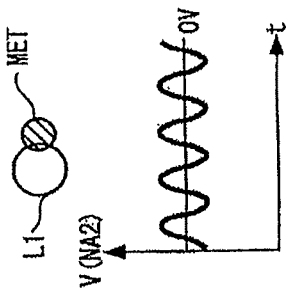

FIG. 21 is a view illustrative of the principle of position detection. As shown in FIG. 21, the waveform (peak value) of the signal PHIN and the voltage level of the signal ADIN change corresponding to the positional relationship between the primary coil (L1) and the secondary coil (L2).

For example, when performing position detection based on the signal ADIN, a direct-current voltage (ADIN) at a given level (V3 level) cannot be obtained when the power-reception-side instrument is placed at an inappropriate position (i.e., the power-reception-side instrument is determined to be placed at an inappropriate position). The position detection result may be transmitted from the power-reception-side instrument to the power-transmission-side instrument utilizing load modulation, for example. The power-reception-side instrument may notify the power-transmission-side instrument that the power-reception-side instrument is placed at an inappropriate position by not transmitting ID authentication information to the power-transmission-side instrument within a given period of time after receiving temporary power transmission.

Again referring to FIG. 15, the power transmission device 10 starts normal power transmission (charge power transmission) after ID authentication (step S6). The power transmission device 10 detects whether or not a metal foreign object is present (metal foreign object detection) (step S7), and detects whether or not a takeover state has occurred (takeover state detection) by means of regular load change detection (steps S8 and S9). The power transmission device 10 detects whether or not the power-reception-side instrument has been removed (leave detection) (step S10), detects whether or not the switch has been turned OFF (switch OFF detection) (step S11), and detects whether or not a full-charge notification (power transmission stop request) has been received (full-charge notification detection) (step S12). When the power transmission device 10 has detected one of the above-mentioned states (step S13), the power transmission device 10 stops normal power transmission (step S14), and returns to the initial state (i.e., a state in which the power transmission device 10 waits for the step S1 to occur).

Whether or not a metal foreign object is present (step S7) and whether or not a takeover state has occurred (step S10) may be detected based on a change in waveform of an induced voltage signal of the primary coil (L1). FIGS. 22A to 22F are views illustrative of the principle of metal foreign object (conductive foreign object) detection. FIGS. 22B to 22F show changes in an induced voltage signal (V(NA2)) of the primary coil (L1) shown in FIG. 22A corresponding to the relative position between the primary coil and a metal foreign object MET (small or medium-sized conductive foreign object).

As shown in FIGS. 22B to 22F, the waveform (amplitude) of the induced voltage signal V(NA2) when the metal foreign object MET is absent (FIG. 22F) differs from the waveform (amplitude) of the induced voltage signal V(NA2) when the metal foreign object (MET) is present (FIGS. 22B to 22E). Therefore, the presence or absence of the metal foreign object (MET) can be detected by monitoring the waveform of the induced voltage signal V(NA2) of the primary coil (L1) using the waveform monitoring circuit 14 (see FIG. 4). The term "waveform monitoring" includes monitoring the amplitude or monitoring the phase of the current or voltage, and the like.

Figure 23A:
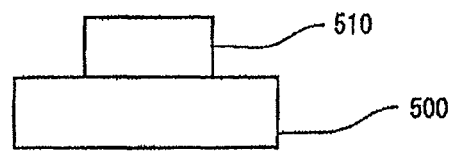
FIGS. 23A to 23D are views illustrative of the principle of removal detection.
Figure 23B:
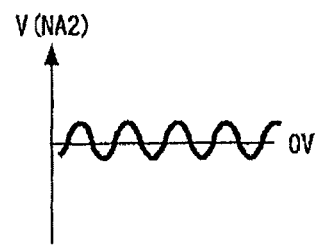
Figure 23C:
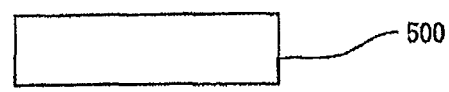

FIGS. 23A to 23D are views illustrative of the principle of removal (leave) detection. When the power-reception-side instrument 510 is placed as shown in FIG. 23A, the induced voltage signal V(NA2) of the primary coil (L1) has a waveform shown in FIG. 23B. When the power-reception-side instrument 510 has been removed (leave) (see FIG. 23C), the primary coil and the secondary coil are decoupled, so that the mutual inductance due to coupling is lost, and a resonance occurs corresponding to only the inductance of the primary coil. As a result, since the resonance frequency increases and approach the transmission frequency, a current easily flows through the power transmission coil, whereby the load with respect to the power-transmission-side instrument increases (i.e., the induced voltage increases). Specifically, the waveform of the induced voltage signal of the primary coil changes.

Figure 23D:
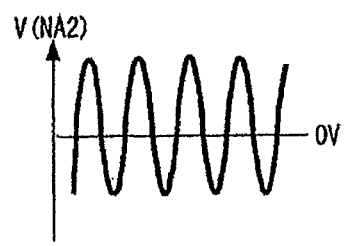

Specifically, the induced voltage signal V(NA2) of the primary coil (L1) has a waveform shown in FIG. 23D. The waveform (amplitude) shown in FIG. 23D clearly differs from the waveform shown in FIG. 23B. Therefore, whether or not the power-reception-side instrument has been removed can be detected by monitoring the waveform of the induced voltage signal V(NA2) of the primary coil (L1) using the waveform monitoring circuit 14 (see FIG. 3). Therefore, removal of the power-reception-side instrument can be detected using a circuit having a simple configuration by utilizing this principle. Unnecessary power consumption does not occur by detecting removal (leave) of the power-reception-side instrument during normal power transmission. Therefore, a reduction in power consumption and an improvement in safety and reliability can be achieved.

Example of Configuration of Power-Transmission-Side Control Circuit

Figure 16:
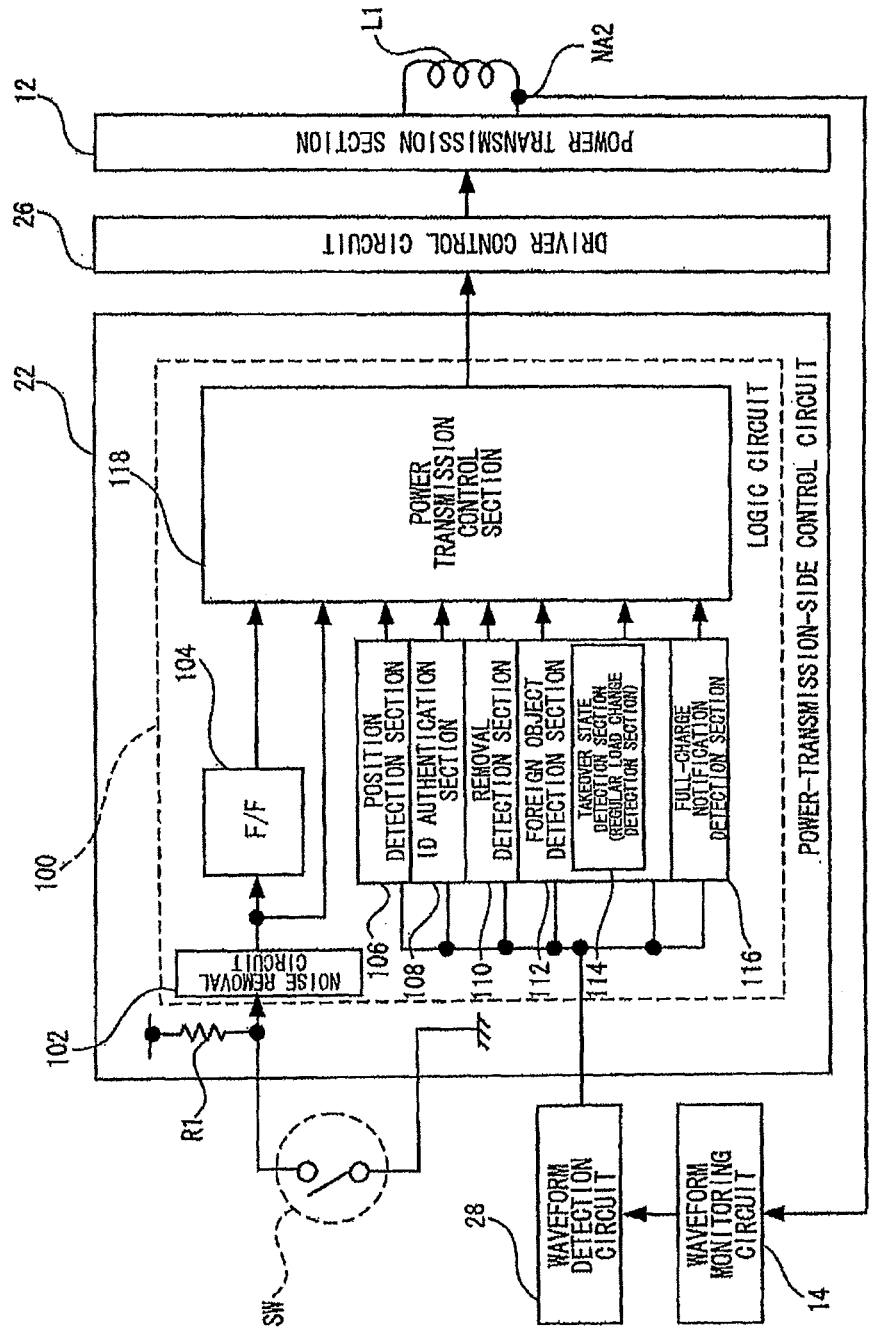
FIG. 16 is a circuit diagram showing an example of the configuration of a power-transmission-side control circuit.

FIG. 16 is a circuit diagram showing an example of the configuration of the power-transmission-side control circuit. As shown in FIG. 16, the power-transmission-side control circuit 22 includes a logic circuit 100.

The logic circuit 100 includes a noise removal circuit 102 that removes noise which occurs when the switch SW is turned ON/OFF, a flip-flop (F/F) 104 that stores whether the present state is the power transmission state or the initial state, a position detection section 106, an ID authentication section 108, a removal (leave) detection section 110, a foreign object detection section 112 (including a takeover state detection section 114), a full-charge notification (power transmission stop request) detection section 116, and a power transmission control section 118 that ON/OFF-controls power transmission based on the detection result of each section.

Basic Sequence Example of Non-Contact Power Transmission System

Figure 17:
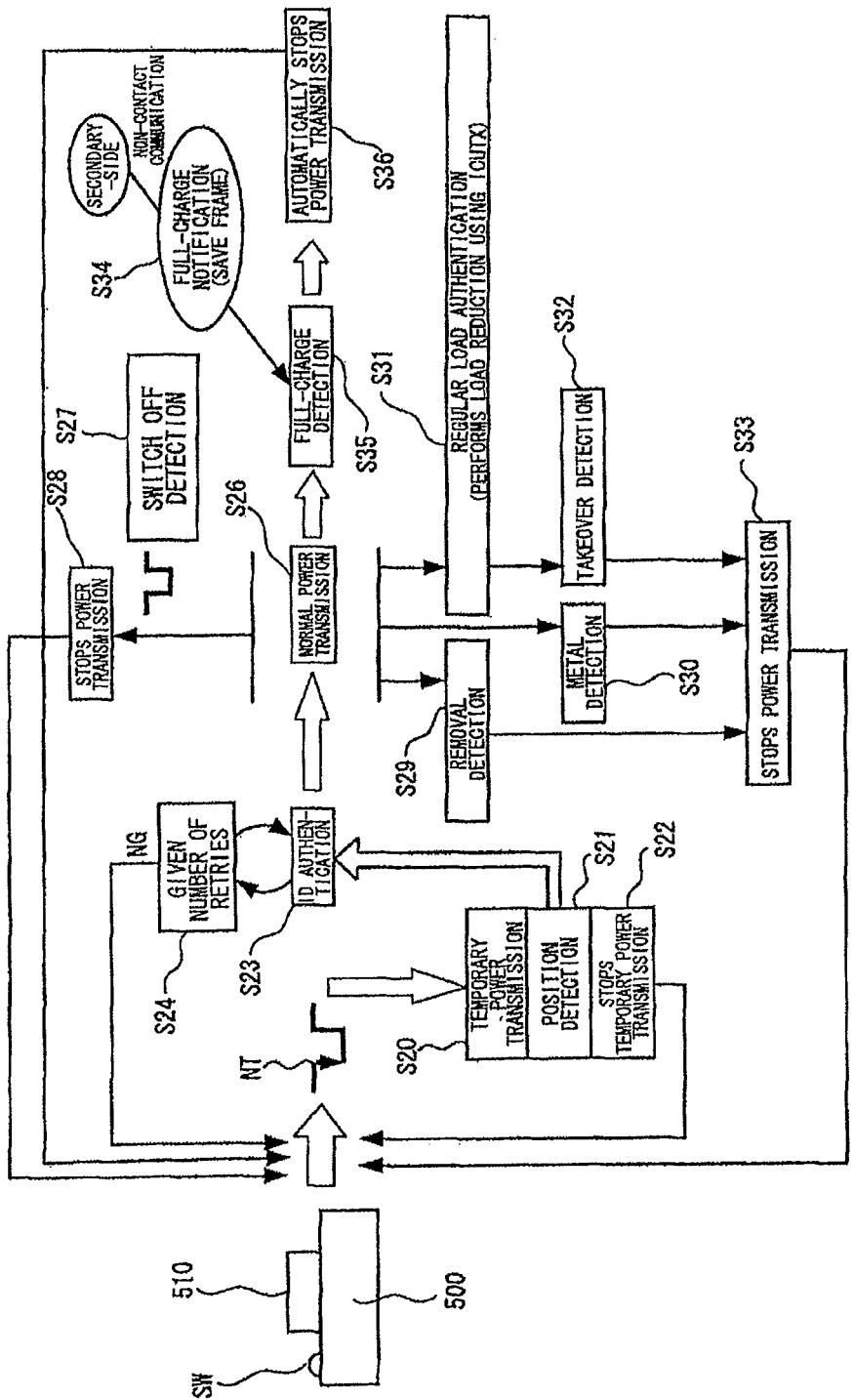
FIG. 17 is a view showing a basic sequence example of a non-contact power transmission system.

FIG. 17 is a view showing a basic sequence example of the non-contact power transmission system. The switch SW is provided on the power-transmission-side electronic instrument (power-transmission-side instrument) 500 (see left). The user places the power-reception-side electronic instrument (power-reception-side instrument) 510 at a predetermined position, and presses the switch SW. The power transmission device 10 starts temporary power transmission based on an edge (e.g., negative edge NT) which occurs when the user has pressed the switch SW as a trigger (S20), and performs position detection (step S21). When the power-reception-side instrument 510 is placed at an inappropriate position, the power transmission device 10 stops temporary power transmission (step S22).

When the power-reception-side instrument 510 is placed at an inappropriate position, the power transmission device 10 performs ID authentication (step S23). Specifically, ID authentication information (e.g., manufacturer information, instrument ID number, and rating information) is transmitted from the power-reception-side instrument to the power-transmission-side instrument. Since ID authentication may fail accidentally, it is preferable to allow a given number of (e.g., three) retries taking convenience to the user into account, and determine that ID authentication has failed when failure (NG) has occurred successively (step S24).

After ID authentication, the power transmission device 10 starts normal power transmission for the power reception device 40 (step S26). When the power transmission device 10 has detected that the switch (SW) has been pressed (turned OFF) during normal power transmission (step S27), the power transmission device 10 stops normal power transmission and returns to the initial state (step S28).

The power transmission device 10 performs removal detection (step S29), metal foreign object detection (step S30), secondary-side regular load authentication (including a secondary-side load reduction process: step S31), and takeover state detection (step S32), and stops normal power transmission when one of these states has been detected (step S33). The term "load reduction" accompanying secondary-side regular load authentication refers to a process that reduces (or stops) power supplied to the battery when performing load modulation to apparently reduce the load state of the battery, since the primary-side instrument may not successfully receive a modulation signal when load modulation is performed in a state in which the load state of the battery is heavy.

In FIG. 17, when the power reception device 40 has detected that a full-charge state has occurred, the power reception device 40 creates a full-charge notification (save frame; power transmission stop request frame) and transmits the full-charge notification to the power-transmission-side instrument (step S34). When the power transmission device 10 has detected the full-charge notification (power transmission stop request frame) (step S35), the power transmission device 10 stops normal power transmission and returns to the initial state (step S36).

Figure 18:
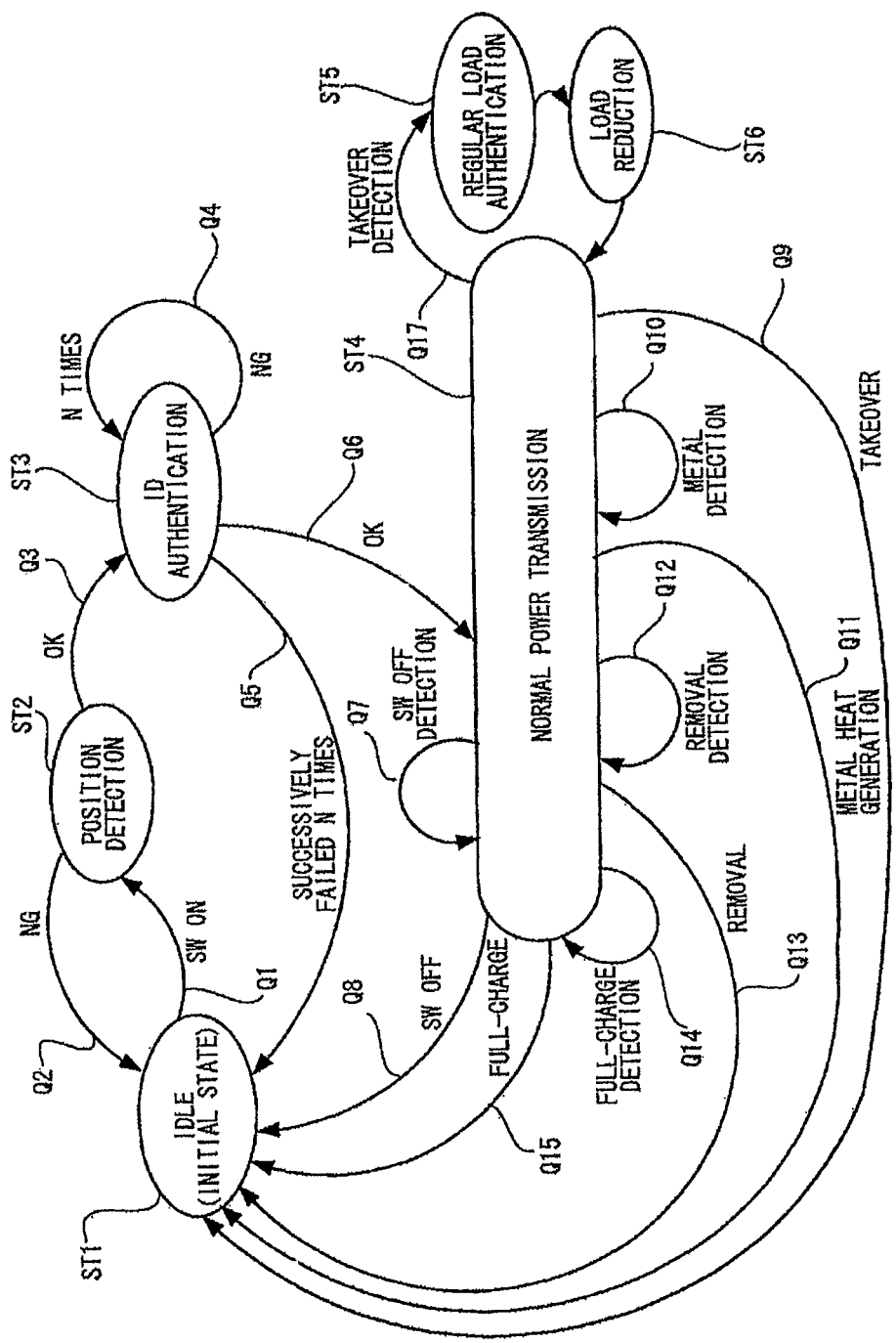
FIG. 18 is a state transition diagram showing the state transition of a non-contact power transmission system that performs the sequence shown in FIG. 17.

FIG. 18 is a state transition diagram showing the state transition of the non-contact power transmission system that performs the sequence shown in FIG. 17. As shown in FIG. 18, the state of the non-contact power transmission system is roughly divided into an initial state (idle state: ST1), a position detection state (ST2), an ID authentication state (ST3), a power transmission (normal power transmission) state (ST4), and a regular load authentication state (ST5) (and a load reduction state (ST6)).

The non-contact power transmission system transitions from the state ST1 to the state ST2 when the switch has been turned ON (Q1), and returns to the state ST1 (Q2) when the position detection result is inappropriate (NG). When the position detection result is appropriate (OK), the non-contact power transmission system monitors whether or not ID authentication successively fails a plurality of times (Q4). When ID authentication has successively failed (Q5), the non-contact power transmission system transitions to the state ST1. When ID authentication has succeeded (Q6), the non-contact power transmission system transitions to the state ST4.

The non-contact power transmission system performs switch (SW) OFF detection (Q7), removal detection (Q12), metal detection (Q10), takeover state detection (Q17), and full-charge detection (Q14). The non-contact power transmission system returns to the initial state when one of these states has been detected (Q8, Q9, Q11, Q13, or Q15).

Since the non-contact power transmission system that performs the basic sequence shown in FIG. 17 starts power transmission when the switch has been turned ON, a reduction in power consumption and an improvement in safety can be achieved. Since the non-contact power transmission system stops power transmission and returns to the initial state (switch ON wait state) when the non-contact power transmission system has received the full-charge notification (power transmission stop request), unnecessary power transmission does not occur. Therefore, a reduction in power consumption and an improvement in safety can be achieved.

Since normal power transmission is performed after ID authentication has been completed successfully, power is not transmitted to an inappropriate instrument. Therefore, reliability and safety are improved.

Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

Figure 19:
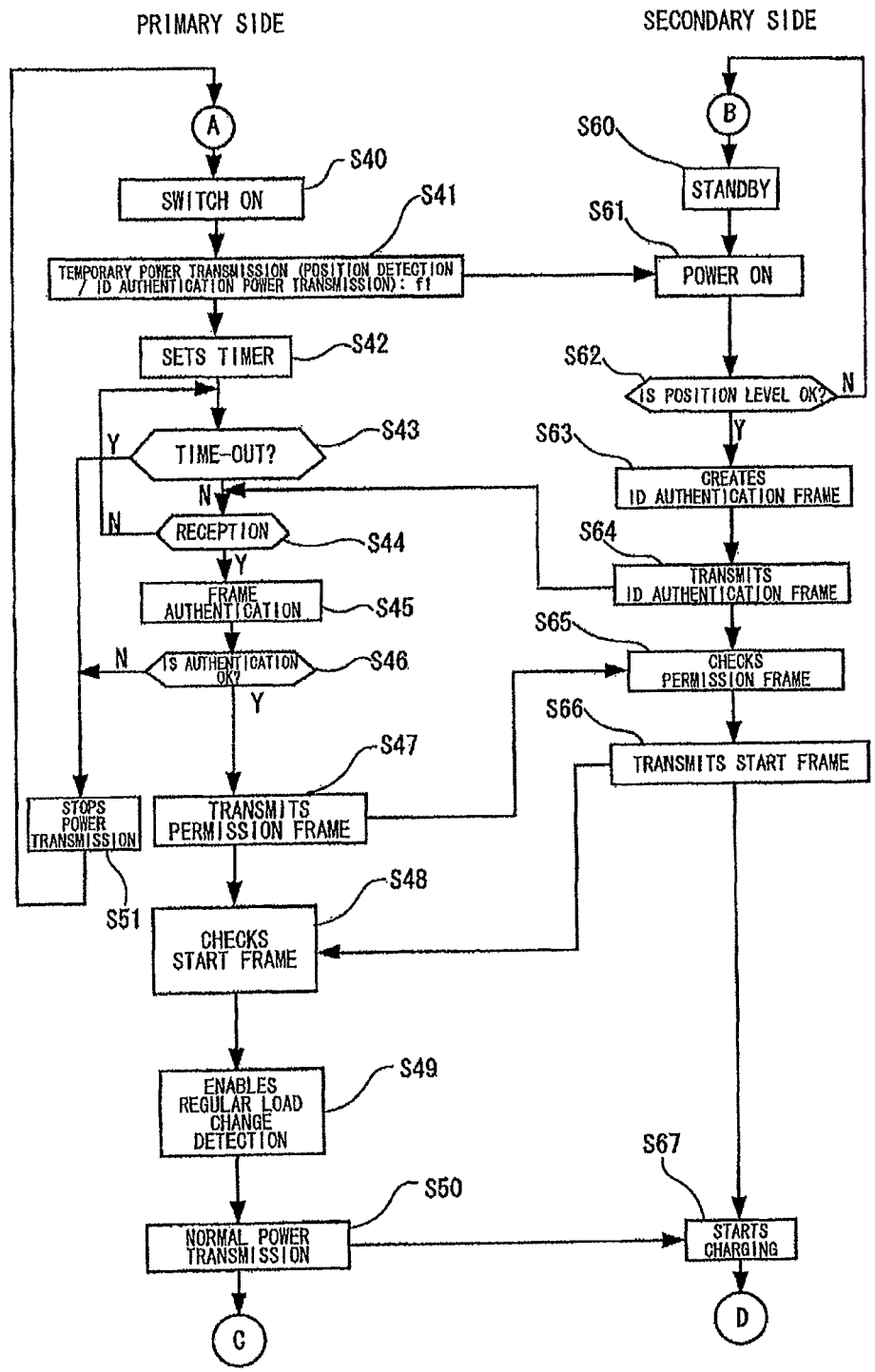
FIG. 19 is a flowchart showing an operation example of a non-contact power transmission system that performs the basic sequence shown in FIG. 17.
Figure 20:
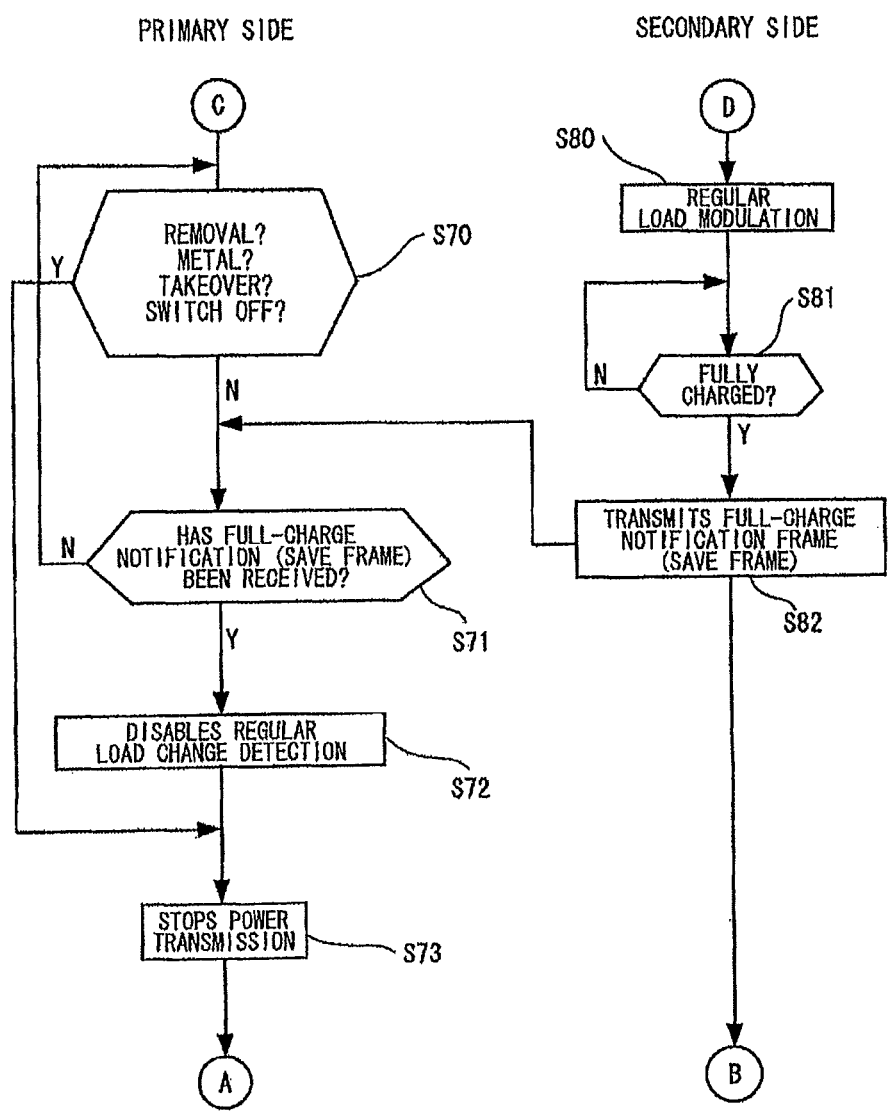
FIG. 20 is a flowchart showing an operation example of a non-contact power transmission system that performs the basic sequence shown in FIG. 17.

FIGS. 19 and 20 are flowcharts showing an operation example of the non-contact power transmission system that performs the basic sequence shown in FIG. 17. In FIGS. 19 and 20, a primary-side operation flow is shown on the left, and a secondary-side operation flow is shown on the right.

As shown in FIG. 19, when the switch SW has been turned ON (step S40), the power-transmission-side instrument starts temporary power transmission (e.g., the transmission frequency is f1; step S41), and a timer starts a count operation (step S42).

The power-reception-side instrument transitions from a standby state (step S60) to a power-ON state (step S61) when the power-reception-side instrument has received temporary power transmission, and determines the position level (position detection). When the position level is inappropriate (NG), the power-reception-side instrument returns to the initial state (step S60). When the position level is appropriate (OK), the power-reception-side instrument creates the ID authentication frame (S63), and transmits the ID authentication frame (step S64).

The power-transmission-side instrument receives the ID authentication frame (step S44), and determines whether or not a time-out has occurred (step S43). When the power-transmission-side instrument cannot receive the ID authentication frame within a given period of time, the power-transmission-side instrument stops power transmission (step S49).

When the power-transmission-side instrument has received the ID authentication frame within a given period of time, the power-transmission-side instrument performs a frame authentication process (step S45). When authentication has succeeded (OK), the power-transmission-side instrument transmits a permission frame to the power-reception-side instrument (step S47). When authentication has failed (NG), the power-transmission-side instrument stops power transmission (step S51).

The power-reception-side instrument checks the permission frame transmitted from the power-transmission-side instrument (step S65), and transmits a start frame to the power-transmission-side instrument (step S66).

The power-transmission-side instrument checks the start frame (step S48), enables regular load change detection (takeover state detection) (step S49), and starts charge power transmission (normal power transmission) (step S50).

The power-reception-side instrument receives charge power transmission (normal power transmission), and starts charging the battery (step S67).

FIG. 20 shows the subsequent flow. The power-transmission-side instrument waits for the full-charge notification (power transmission stop request) from the power-reception-side instrument (step S71) while performing removal detection, metal foreign object detection, takeover state detection, and switch OFF detection (step S70).

The power-reception-side instrument performs regular load modulation for takeover detection while charging the battery (step S80), and detects whether or not the battery has been fully charged (step S81). When the power-reception-side instrument has detected that the battery has been fully charged, the power-reception-side instrument transmits the full-charge notification frame (save frame; power transmission stop request) to the power-transmission-side instrument (step S82).

When the power-transmission-side instrument has received the full-charge notification frame (save frame; power transmission stop request) from the power-reception-side instrument, the power-transmission-side instrument disables regular load change detection (step S72), and stops power transmission (step S73).

The non-contact power transmission system according to the above-described embodiments that performs the above-described operations achieves the following main effects. Note that the following effects are not necessarily achieved at the same time.

(1) Since the non-contact power transmission system starts power transmission when the switch has been turned ON, a reduction in power consumption and an improvement in safety can be achieved.

(2) The switch is utilized so that the user turns the switch ON after placing the secondary-side instrument or places the secondary-side instrument after turning ON the switch, for example. In either case, since power transmission (including temporary power transmission) starts when the user has turned the switch ON (i.e., the user has indicated his intention to start charging), a situation in which power transmission starts by surprise is prevented so that the user feels more reassured. When the secondary-side instrument has been placed, the switch may be turned ON due to the weight of the secondary-side instrument. In this case, the user need not turn the switch ON.

(3) Since the non-contact power transmission system stops power transmission and returns to the initial state (switch ON wait state) when the non-contact power transmission system has received the full-charge notification (power transmission stop request), unnecessary power transmission does not occur. Therefore, a reduction in power consumption and an improvement in safety can be achieved.

(4) Since normal power transmission is performed after ID authentication has been completed successfully, power is not transmitted to an inappropriate instrument. Therefore, reliability and safety are improved.

(5) Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

Although only some embodiments of the invention have been described in detail above, those skilled in the art would readily appreciate that many modifications are possible in the embodiments without materially departing from the novel teachings and advantages of the invention. Specifically, many modifications are possible without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmission device, the power reception control device, and the power reception device and the method of detecting the secondary-side load by the primary side instrument are not limited to those described in the above embodiments. Various modifications and variations may be made.

The invention achieves the effect of providing a highly reliable non-contact power transmission system with low power consumption. Therefore, the invention is useful for a power transmission control device (power transmission control IC), a power transmission device (e.g., IC module), a non-contact power transmission system, and an electronic instrument (e.g., portable terminal and charger). Note that the term "portable terminal" includes a portable telephone terminal, a PDA terminal, and a portable computer terminal.

What is claimed is:

1. A power reception control device includable in a non-contact power transmission system that performs non-contact power transmission from a power transmission device to a power reception device through a primary coil and a secondary coil, the power reception device supplying power to a first load, the power reception control device comprising:
    a power reception section that converts an induced voltage in the secondary coil into a direct-current voltage;
    a load modulation section that modulates a second load of the power reception section; and
    a power-reception-side control section that controls an operation of the power reception device,
    the first load including a charge control device that controls power supplied to a battery,
    the load modulation section being configured to transmit information from the power reception device to the power transmission device through the secondary coil and the primary coil utilizing load modulation of the second load, and
    the power-reception-side control section being configured to reduce the power supplied to the battery by controlling a charge operation of the charge control device when the power-reception-side control section controls the load modulation section to transmit the information from the power reception device to the power transmission device.

2. The power reception control device as defined in claim 1, the power-reception-side control section being configured to control the charge operation of the charge control device using a power supply control signal that is output to the charge control device.

3. The power reception control device as defined in claim 2, the power-reception-side control circuit creating a load reduction period in which power supplied to the battery is reduced or stopped and causing the load modulation section to perform load modulation during the load reduction period.

4. An integrated circuit device, comprising:
the power reception control device as defined in claim 2.

5. The power reception control device as defined in claim 1, the power-reception-side control section controlling the load modulation section to transmit the information while the charge control device compulsorily reduces or stops power supplied to the battery.

6. The power reception control device as defined in claim 5, the power-reception-side control circuit creating a load reduction period in which power supplied to the battery is reduced or stopped and causing the load modulation section to perform load modulation during the load reduction period.

7. An integrated circuit device, comprising:
the power reception control device as defined in claim 5.

8. The power reception control device as defined in claim 1, the power-reception-side control section being configured to transmit a foreign object detection pattern that allows the power transmission device to detect a takeover state by causing the load modulation section to modulate the second load, the takeover state being a state in which the power transmission device: (1) regards a foreign object placed between the primary coil and the secondary coil as the power reception device and (2) continues power transmission.

9. The power reception control device as defined in claim 8, the power-reception-side control circuit creating a load reduction period in which power supplied to the battery is reduced or stopped and causing the load modulation section to perform load modulation during the load reduction period.

10. An integrated circuit device, comprising:
the power reception control device as defined in claim 8.

11. The power reception control device as defined in claim 1,
the power-reception-side control circuit creating a load reduction period in which power supplied to the battery is reduced or stopped and causing the load modulation section to perform load modulation during the load reduction period.

12. An integrated circuit device, comprising:
the power reception control device as defined in claim 11.

13. An integrated circuit device, comprising:
the power reception control device as defined in claim 1.

14. An electronic instrument, comprising:
the power reception control device as defined in claim 1; and
the secondary coil.

15. An electronic instrument, comprising:
the power reception control device as defined in claim 1;
the charge control device; and
the battery.

16. A non-contact power transmission system, comprising:
the power reception control device as defined in claim 1;
the power transmission device;
the primary coil; and
the secondary coil.

17. A power reception control method for a non-contact power transmission system that performs non-contact power transmission from a power transmission device to a power reception device through a primary coil and a secondary coil, the power reception device supplying power to a first load that includes a charge control device for controlling power supplied to a battery, the power reception method comprising:
- operating a power reception section and converting an induced voltage in the secondary coil into a direct-current voltage;
- supplying power to the first load;
- modulating a second load of the power reception section;
- transmitting information from the power reception device to the power transmission device through the secondary coil to the primary coil utilizing a load modulation of the second load; and
- reducing the power supplied from the power reception section to the battery by controlling a charge operation of the charge control device when the information is transmitted from the power reception device to the power transmission device.

18. The power reception control method as defined in claim 17, further comprising:
- transmitting the information while the charge control device compulsorily reduces or stops power supplied to the battery.

* * * * *